United States Patent
Seo et al.

(10) Patent No.: US 12,436,671 B2
(45) Date of Patent: Oct. 7, 2025

(54) ELECTRONIC APPARATUS AND UI PROVIDING METHOD THEREOF

(71) Applicant: SAMSUNG ELECTRONICS CO., LTD., Suwon-si (KR)

(72) Inventors: Jangwon Seo, Suwon-si (KR); Byeongju Lee, Suwon-si (KR); Eugene Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 18/200,887

(22) Filed: May 23, 2023

(65) Prior Publication Data

US 2023/0409180 A1     Dec. 21, 2023

Related U.S. Application Data

(63) Continuation of application No. PCT/KR2023/003246, filed on Mar. 9, 2023.

(30) Foreign Application Priority Data

Jun. 16, 2022  (KR) ........................ 10-2022-0073540

(51) Int. Cl.
  *G06F 3/04847*    (2022.01)
  *G06F 3/0482*     (2013.01)
  *G06F 3/0487*     (2013.01)

(52) U.S. Cl.
  CPC ........ *G06F 3/04847* (2013.01); *G06F 3/0482* (2013.01); *G06F 3/0487* (2013.01)

(58) Field of Classification Search
  CPC .. G06F 3/04847; G06F 3/0482; G06F 3/0487; G06F 3/0362; G06F 3/041;
  (Continued)

(56) References Cited

U.S. PATENT DOCUMENTS

| | | |
|---|---|---|
| 7,812,824 B2 | 10/2010 | Im et al. |
| 8,935,630 B2 | 1/2015 | Wroblewski |

(Continued)

FOREIGN PATENT DOCUMENTS

| | | |
|---|---|---|
| JP | 2013-178516 A | 9/2013 |
| KR | 10-0606803 B1 | 8/2006 |

(Continued)

OTHER PUBLICATIONS

International Search Report (PCT/ISA/210) issued Jun. 16, 2023 by the International Searching Authority in counterpart International Application No. PCT/KR2023/003246.

(Continued)

*Primary Examiner* — Tuyetlien T Tran
(74) *Attorney, Agent, or Firm* — Sughrue Mion, PLLC

(57) ABSTRACT

An electronic apparatus comprising: a display; and one or more processors configured to: control the display to display a user interface (UI) screen including a plurality of graphical user interface (GUI) items and a focus GUI located on a first GUI item from the plurality of GUI items, identify, based on at least one of a rotation distance or a rotation speed of a wheel on a user input device, an input type of the wheel input from a plurality of input types of wheel inputs, and control the display based on identification of the wheel input as one of a first input type, second input type, and third input type.

15 Claims, 23 Drawing Sheets

(58) Field of Classification Search
CPC .. G06F 3/0481; G06F 3/0484; G06F 3/04842; G06F 3/0488; G06F 3/0485; G06F 3/0412; H04N 21/42204
See application file for complete search history.

(56) References Cited

U.S. PATENT DOCUMENTS

| | | | |
|---|---|---|---|
| 9,927,957 | B1 | 3/2018 | Sagar et al. |
| 10,477,134 | B2 | 11/2019 | Lim et al. |
| 10,866,719 | B1* | 12/2020 | Bulusu ............... H04L 51/52 |
| 10,929,005 | B2 | 2/2021 | Jung et al. |
| 2006/0250355 | A1* | 11/2006 | Miller-Smith ... H04N 21/41407 348/E5.105 |
| 2006/0250358 | A1 | 11/2006 | Wroblewski |
| 2007/0094417 | A1 | 4/2007 | Hur et al. |
| 2007/0152981 | A1 | 7/2007 | Im et al. |
| 2007/0296711 | A1 | 12/2007 | Yee et al. |
| 2008/0055241 | A1* | 3/2008 | Goldenberg ........ G06F 3/04812 345/156 |
| 2008/0126981 | A1* | 5/2008 | Candrian ........... G06Q 30/0621 715/810 |
| 2009/0002396 | A1 | 1/2009 | Andrews et al. |
| 2009/0265658 | A1* | 10/2009 | Klishko ............ G06F 3/0485 715/702 |
| 2010/0306703 | A1 | 12/2010 | Bourganel et al. |
| 2012/0242576 | A1* | 9/2012 | Mizunuma ......... G06F 3/04886 345/158 |
| 2014/0149922 | A1* | 5/2014 | Hauser .............. G06F 3/0485 715/784 |
| 2015/0100923 | A1 | 4/2015 | Wroblewski |
| 2016/0098016 | A1* | 4/2016 | Ely ....................... G04G 21/00 368/308 |
| 2017/0277498 | A1* | 9/2017 | Wood, Jr. ............. G06F 3/0481 |
| 2017/0315716 | A1 | 11/2017 | Zambetti et al. |
| 2018/0181274 | A1 | 6/2018 | Jung et al. |
| 2019/0114064 | A1* | 4/2019 | Monibi ............... G06F 3/0488 |
| 2022/0334669 | A1* | 10/2022 | Sanders ............. G06F 3/04842 |
| 2023/0393720 | A1* | 12/2023 | De Vries ............ G06F 3/04815 |
| 2024/0310973 | A1* | 9/2024 | Hou .................... G06F 3/04892 |

FOREIGN PATENT DOCUMENTS

| | | |
|---|---|---|
| KR | 10-2007-0071126 A | 7/2007 |
| KR | 10-0792295 B1 | 1/2008 |
| KR | 10-2008-0024472 A | 3/2008 |
| KR | 10-2012-0005142 A | 1/2012 |
| KR | 10-1354422 B1 | 1/2014 |
| KR | 10-2017-0019811 A | 2/2017 |
| KR | 10-2018-0075989 A | 7/2018 |
| KR | 10-2018-0082812 A | 7/2018 |

OTHER PUBLICATIONS

Written Opinion (PCT/ISA/237) issued Jun. 16, 2023 by the International Searching Authority in counterpart International Application No. PCT/KR2023/003246.

Extended European Search Report issued Apr. 28, 2025 by the European Patent Office for EP Patent Application No. 23824042.8.

* cited by examiner

ELECTRONIC APPARATUS AND UI PROVIDING METHOD THEREOF

CROSS-REFERENCE TO RELATED APPLICATIONS

This application is a by-pass continuation application of International Application No. PCT/KR2023/003246, filed on Mar. 9, 2023, which claims priority to Korean Patent Application No. 10-2022-0073540, filed on Jun. 16, 2022 in the Korean Intellectual Property Office, the disclosures of each of which are incorporated by reference herein in their entirety.

BACKGROUND ART

1. Field

The present disclosure relates to an electronic apparatus and a UI providing method thereof, and more particularly, to an electronic apparatus controlling a UI screen based on a wheel input and a UI providing method thereof.

2. Description of the Related Art

Due to developments in electronic technology, various types of input devices are being developed. In particular, in order to meet the demands of users who want newer and more diverse functions, input devices through which users may easily control objects, such as a wheel device and a touch device, are gradually developing.

When manipulating a UI screen using an existing wheel device, there were problems that only a manipulation feedback with respect to a single key is present, which provides only a monotonous experience. Furthermore, the interaction for fine movements before an event occurs, or when turning faster than a set speed, are not separately defined. For example, there is a problem in that a step of a wheel input is not subdivided, which fails to provide users with a manipulation experience suitable for each intention of the user with respect to a fine manipulation or a rapid continuous operation.

SUMMARY

According to one or more embodiments, an electronic apparatus comprises: a display; and one or more processors configured to: control the display to display a user interface (UI) screen including a plurality of graphical user interface (GUI) items and a focus GUI located on a first GUI item from the plurality of GUI items, identify, based on at least one of a rotation distance or a rotation speed of a wheel on a user input device, an input type of the wheel input from a plurality of input types of wheel inputs, based on identification of the wheel input as a first input type, control the display to provide a first UI feedback to at least one of the first GUI item, a second GUI item corresponding to the rotation direction of the wheel input, or the focus GUI, based on identification of the wheel input as a second input type, control the display to move the focus GUI to the second GUI item and display the focus GUI, and based on identification of the wheel input as a third input type, control the display to provide a second UI feedback to the focus GUI while continuously moving the focus GUI sequentially through the plurality of GUI items corresponding to the rotation direction of the wheel input.

The first input type is identified based on an event that returns to a manipulation start point after a tick input corresponding to movement of the wheel is less than a threshold number is generated, the second input type is identified based on an event in which tick inputs corresponding to movement of the wheel greater than or equal to the threshold number are generated at a speed less than a threshold speed, the third input type is identified based on an event in which tick inputs corresponding to movement of the wheel greater than or equal to the threshold number are generated at a speed greater than or equal to the threshold speed, and the tick input is an input corresponding to a basic manipulation unit of the wheel on at least one of a wheel button or a touch panel receiving the wheel input.

The first UI feedback includes at least one of a feedback providing a motion to the first GUI item, a feedback changing a transparency of the focus GUI located on the first GUI item, a feedback displaying a focus GUI with a preset transparency on the second GUI item, or a feedback changing a size of the second GUI item, and the second UI feedback includes a feedback continuously moving sequentially through the plurality of GUI items corresponding to the rotation direction of the wheel input by changing the transparency of the focus GUI.

The one or more processors are configured to: enter a continuous key mode based on the wheel input being identified as the third input type, and release the continuous key mode based on the wheel input of the third input type not being identified for a threshold time in the continuous key mode.

The second input type is identified based on an event in which tick inputs corresponding to movement of the wheel greater than or equal to the threshold number are generated at the speed less than the threshold speed, and the one or more processors are configured to, based on the wheel input being identified while content is played back through the display, identify the threshold number corresponding to the second input type as having a value such that the threshold number corresponding to the second input type is inversely proportional to a length of the content.

The one or more processors are configured to: identify the threshold number corresponding to the second input type as a first number based on a length of a first content, and adjust a playback section of the first content by a preset time section based on a wheel input of the second input type in which the first number of tick inputs is generated at the speed less than the threshold speed, identify the threshold number corresponding to the second input type as a second number greater than the first number based on a length of a second content and adjust a playback section of the second content by the preset time section based on the wheel input of the second input type in which the second number of tick inputs is generated at the speed less than the threshold speed, and identify the threshold number corresponding to the second input type as a third number greater than the second number based on a length of a third content and adjust a playback section of the content by the preset time section based on the wheel input of the second input type in which the third number of tick inputs is generated at the speed less than the threshold speed, wherein the length of the second content is longer than the length of the first content and shorter than the length of the third content.

The second input type is identified based on an event in which tick inputs greater than or equal to the threshold number are generated at a speed less than a threshold speed, and the one or more processors are configured to, based on the wheel input being identified while a continuous adjustment UI having an adjustable range is provided through the display, identify the threshold number corresponding to the second input type as having a value such that the threshold number corresponding to the second input type is inversely proportional to a length of the adjustable range.

The one or more processors are configured to control the display to provide the first UI feedback based on the wheel input being identified as the first input type before the focus GUI moves horizontally from the first GUI item to the second GUI item, before the focus GUI moves vertically from the first GUI item to the second GUI item, or before the focus GUI moves vertically from the first GUI item to the second GUI item and a line break occurs.

The one or more processors are configured to, based on a determination that a GUI item having a same depth as that of the first GUI item is not arranged at a location corresponding to the rotation direction of the wheel input, control the display to display a GUI item having a different depth from that of the first GUI item or control the display to move the focus GUI to a GUI item of a different depth arranged at a location corresponding to the rotation direction and display the focus GUI.

The one or more processors are configured to, based on the wheel input being identified as the second input type, control the display to increase a size of the second GUI item while moving the focus GUI to the second GUI item and displaying the focus GUI, and based on the wheel input being identified as the third input type, control the display to continuously move the focus GUI to the plurality of GUI items corresponding to the rotation direction of the wheel input so that a size of a GUI item on which the focus GUI is located is maintained.

According to one or more embodiments, a method of providing a UI of an electronic apparatus, the method comprising: displaying a user interface (UI) screen including a plurality of graphical user interface (GUI) items and a focus GUI located on a first GUI item from the plurality of GUI items; identifying, based on at least one of a rotation distance or a rotation speed of a wheel on a user input device, an input type of the wheel input from a plurality of input types of wheel inputs; and controlling the UI screen based on the identified input type of the wheel input, and wherein the controlling of the UI screen includes, based on identification of the wheel input as a first input type, providing a first UI feedback to at least one of the first GUI item, a second GUI item corresponding to the rotation direction of the wheel input, or the focus GUI, based on identification of the wheel input as a second input type, moving the focus GUI to the second GUI item and displaying the focus GUI, and based on identification of the wheel input as a third input type, providing a second UI feedback to the focus GUI while continuously moving the focus GUI sequentially through a plurality of GUI items corresponding to the rotation direction of the wheel input.

The first input type is identified based on an event that returns to a manipulation start point after a tick input corresponding to movement of the wheel less than a threshold number is generated, the second input type is identified based on an event in which tick inputs corresponding to movement of the wheel greater than or equal to the threshold number are generated at a speed less than a threshold speed, the third input type is identified based on an event in which tick inputs corresponding to movement of the wheel greater than or equal to the threshold number are generated at a speed greater than or equal to the threshold speed, and the tick input is an input corresponding to a basic manipulation unit of the wheel on at least one of a wheel button or a touch panel receiving the wheel input.

The first UI feedback includes at least one of a feedback providing a motion to the first GUI item, a feedback changing a transparency of the focus GUI located on the first GUI item, a feedback displaying a focus GUI with a preset transparency on the second GUI item, or a feedback changing a size of the second GUI item, and the second UI feedback includes a feedback continuously moving sequentially through the plurality of GUI items corresponding to the rotation direction of the wheel input by changing the transparency of the focus GUI.

The controlling of the UI screen includes entering a continuous key mode based on the wheel input being identified as the third input type, and releasing the continuous key mode based on the wheel input of the third input type not being identified for a threshold time in the continuous key mode.

The second input type is identified based on an event in which tick inputs corresponding to movement of the wheel greater than or equal to the threshold number are generated at the speed less than the threshold speed, the method further comprising: based on the wheel input being identified while content is played back through the display, identifying the threshold number corresponding to the second input type as having a value such that the threshold number corresponding to the second input type is inversely proportional to a length of the content.

According to one or more embodiments, a non-transitory computer readable medium having instructions stored therein, which when executed by a processor cause the processor to execute method of providing a UI of an electronic apparatus, the method comprising: displaying a user interface (UI) screen including a plurality of graphical user interface (GUI) items and a focus GUI located on a first GUI item from the plurality of GUI items; identifying, based on at least one of a rotation distance or a rotation speed of a wheel on a user input device, an input type of the wheel input from a plurality of input types of wheel inputs; and controlling the UI screen based on the identified input type of the wheel input, and wherein the controlling of the UI screen includes, based on identification of the wheel input as a first input type, providing a first UI feedback to at least one of the first GUI item, a second GUI item corresponding to the rotation direction of the wheel input, or the focus GUI, based on identification of the wheel input as a second input type, moving the focus GUI to the second GUI item and displaying the focus GUI, and based on identification of the wheel input as a third input type, providing a second UI feedback to the focus GUI while continuously moving the focus GUI sequentially through a plurality of GUI items corresponding to the rotation direction of the wheel input.

DETAILED DESCRIPTION

Figure 1:
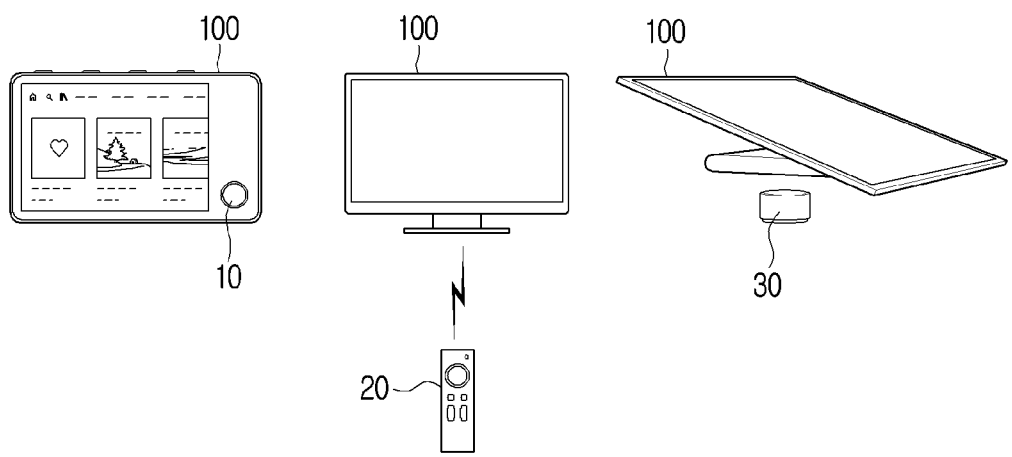
FIG. 1 is diagrams of an implementation of an electronic apparatus, according to one or more embodiments of the present disclosure.

The present disclosure will now be described in detail with reference to the accompanying drawings.

The terms used herein will be briefly described, and the present disclosure will be described in detail.

Although general terms used in the present disclosure are selected to describe embodiments in consideration of the functions thereof, these general terms may vary according to intentions of one of ordinary skill in the art, legal or technical interpretation, the advent of new technologies, etc. Some terms are arbitrarily selected by the applicant of the embodiments. In this case, the meaning will be described in detail in the description of the present disclosure. Accordingly, the terms used in the present disclosure should be defined based on the meaning of the term, not on the name of a simple term, but on the entire contents of the disclosure.

Terms such as first and second may be used to describe various components, but the components should not be limited by the terms. Terms are used only for the purpose of distinguishing one component from another.

The singular forms "a", "an" and "the" include plural forms unless the context clearly dictates otherwise. In the present application, the terms "include" or "configure" etc., specify the presence of a feature, a number, a step, an operation, an element, a component, or a combination thereof but do not preclude the presence or addition of one or more features, numbers, steps, operations, components, parts, or combinations thereof.

The expression at least one of A or B should be understood to denote either "A" or "B" or "A and B".

In the present disclosure, the terms "module" or "part" may perform at least one function or operation and may be implemented as hardware, software, or a combination of hardware and software. Also, a plurality of "modules" or a plurality of "parts" may be implemented as at least one processor integrated into at least one module, except for a "module" or a "part" that is necessarily implemented as specific hardware.

Hereinafter, with reference to the accompanying drawings, embodiments of the present disclosure will be described in detail so that those skilled in the art may easily carry out the present disclosure. However, the present disclosure may be implemented in many different forms and is not limited to the embodiments described herein. Also, in order to clearly describe the present disclosure in the drawings, parts irrelevant to the description are omitted, and similar reference numerals are attached to similar parts throughout the specification.

FIG. 1 is a diagram of an implementation of an electronic apparatus, according to one or more embodiments of the present disclosure.

Referring to FIG. 1, an electronic apparatus 100 may include a wheel input device 10 (or a wheel device), or may be implemented as a display apparatus remotely controllable by wheel input devices 20 and 30. According to one or more examples, the electronic apparatus 100 is applicable without being limited to any apparatus having a display function, such as a TV, a tablet PC, a mobile phone, a desktop PC, a laptop PC, a PDA, a portable multimedia player (PMP), a large format display (LFD), a digital signage, a digital information display (DID), a video wall, a projector, a refrigerator, an air conditioner, an air purifier, or a medical device. Here, each of the wheel input devices 10, 20, and 30 may be implemented as a circular rotatable physical wheel device as shown, but are not necessarily limited thereto, and may be implemented as a software wheel displayed on a touch screen. For example, the wheel on input devices 10, 20, or 30 may be physical wheel that is rotatable, or a graphical wheel displayed on a screen that may be manipulated by a user.

According to one or more examples, the electronic apparatus 100 may provide a UI screen including a plurality of GUI items and control a navigation operation between the plurality of GUI items based on wheel inputs received through the wheel input devices 10, 20, and 30. According to one or more examples, the electronic apparatus 100 may provide a content playback screen and adjust a content playback section based on the wheel inputs received through the wheel input devices 10, 20, and 30. According to one or more examples, the electronic apparatus 100 may provide a continuous adjustment UI and adjust various values based on the wheel inputs received through the wheel input devices 10, 20, and 30. Furthermore, the electronic apparatus 100 may perform various control functions according to the type/function of a screen provided based on the wheel inputs received through the wheel input devices 10, 20, and 30.

According to one or more embodiments, a wheel input may be of various types, and different functions may be performed by the electronic apparatus 100 according to the type of wheel input. Hereinafter, various functions performed by the electronic apparatus 100 according to the type of wheel input are described in detail.

Figure 2A:
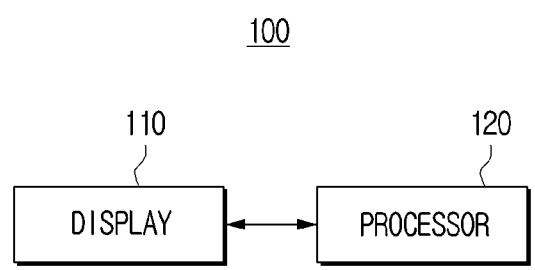
FIG. 2A is a block diagram illustrating a configuration of an electronic apparatus, according to one or more embodiments.

FIG. 2A is a block diagram illustrating a configuration of an electronic apparatus according to one or more embodiments.

According to FIG. 2A, the electronic apparatus 100 includes a display 110 and a processor 120.

The display 110 may be implemented as a display including a self-emissive device or a display including a non-emissive device and a backlight. For example, the display 110 may be implemented as various types of displays such as Liquid Crystal Display (LCD), Organic Light Emitting Diodes (OLED) display, Light Emitting Diodes (LED), Plasma Display Panel (PDP), Quantum dot light-emitting diodes (QLED), or any other display known to one of ordinary skill in the art. The display 110 may also include a driving circuit, a backlight unit, etc., that may be implemented in the form of an a-si TFT, a low temperature poly silicon (LTPS) TFT, or an organic TFT (OTFT). The display 110 may be implemented as a touch screen combined with a touch sensor, a flexible display, a rollable display, a 3D display, a display in which a plurality of display modules are physically connected, or any other display configuration known to one of ordinary skill in the art.

One or more processors 120 (hereinafter referred to as processors) are electrically connected to the display 110 to control overall operations of the electronic apparatus 100. The one or more processors 120 may be configured as one or a plurality of processors. The one or more processors may be implemented as at least one software, at least one hardware, or a combination of at least one software and at least one hardware. According to one or more examples, software or hardware logic corresponding to the one or more processors may be implemented in one chip. According to one or more examples, software or hardware logic corresponding to some of the plurality of processors may be implemented in one chip, and software or hardware logic corresponding to the remaining processors may be implemented in another chip.

The processor 120 may perform the operation of the electronic apparatus 100, according to various embodiments of the present disclosure, by executing at least one instruction stored in a memory.

According to one or more embodiments, the processor 120 may be implemented as a digital signal processor (DSP), a microprocessor, a graphics processing unit (GPU), an artificial intelligence (AI) processor, a neural processing unit (NPU), or a time controller (TCON) processing a digital image signal. However, the processor 120 is not limited thereto, and may include one or more of a central processing unit (CPU), a micro controller unit (MCU), a micro processing unit (MPU), a controller, an application processor (AP), a communication processor (CP) or an ARM processor, or may be defined as the corresponding term. Furthermore, the processor 120 may be implemented as a system on chip (SoC) with a processing algorithm embedded or a large scale integration (LSI), or may be implemented as an application specific integrated circuit (ASIC) or a field programmable gate array (FPGA).

According to one or more embodiments, the processor 120 may control the display 110 to display screens of various types controllable by the wheel input devices 10, 20, and 30 such as a UI screen including a plurality of graphical user interface (GUI) items, a content playback screen, a continuous adjustment UI screen, etc.

According to one or more examples, the processor 120 may control the display 110 to display a user interface (UI) screen including the plurality of GUI items and a focus GUI located on a first GUI item among the plurality of GUI items. Here, the plurality of GUI items may be arranged in a specific direction, such as a horizontal direction, a vertical direction, or a diagonal direction, and may have a specific shape (e.g., a rectangle, a rounded rectangle, a circle, a diamond, etc.) The focus GUI may be a form highlighted on the edge of a GUI item, but is not necessarily limited thereto, and may be highlighted on the entire GUI item or on a partial edge.

Furthermore, the processor 120 may identify a type of wheel input based on at least one of a rotation distance or a rotation speed of the wheel input and perform different control functions according to the identified type of wheel input.

The rotation distance may correspond to the rotational angle of a circular wheel and may be acquired by a sensor (e.g., an encoder) provided in each of the wheel input devices 10, 20, and 30. However, the rotation distance is not necessarily limited to this configuration, and, in the case of a software wheel, may be calculated by a program or a formula. The rotation speed may be calculated by dividing the rotation distance (or the rotational angle) by a reference time. The reference time may be determined as various values based on the type, size, and model of each of the wheel input devices 10, 20, and 30.

According to one or more examples, when the wheel input device is implemented as an external device of the electronic apparatus 100, for example, a remote control device, the type of wheel input may be identified based on a remote control signal received from the wheel input device upon manipulation of the wheel input device by a user. For example, the remote control signal may be a short distance communication signal such as a Bluetooth signal or an infrared signal. According to one or more examples, when the wheel input device is implemented as an internal device of the electronic apparatus 100, the type of wheel input may be an electric signal generated by the wheel input device upon manipulation of the wheel input device by a user and received by the processor 120.

According to one or more embodiments, the type of wheel input may have a plurality of predefined types, and may include a first type, a second type, and a third type described below. However, in some cases, each type may be classified into a plurality of detailed types. For example, the third type may be divided into a first sub-type and a second sub-type based on at least one of the rotation distance or the rotation speed of the wheel input, and may provide at least one of a function or a UI feedback differently.

Figure 2B:
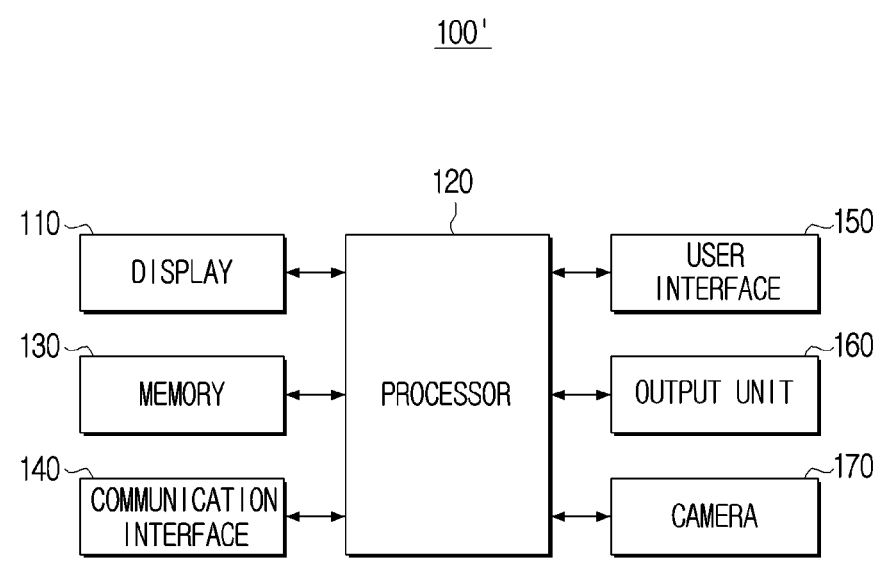
FIG. 2B is a diagram illustrating a detailed configuration of an implementation of an electronic apparatus according to one or more embodiments of the present disclosure.

FIG. 2B is a diagram illustrating a detailed configuration of an implementation example of an electronic apparatus according to one or more embodiments of the present disclosure.

Referring to FIG. 2B, an electronic apparatus 100' includes the display 110, the processor 120, a memory 130, a communication interface 140, a user interface 150, an output unit 160, and a camera 170. Among the components shown in FIG. 2B, detailed descriptions of components redundant with those shown in FIG. 2A will be omitted.

The memory 130 may be electrically connected to the processor 120 and may store data necessary for various embodiments of the present disclosure. The memory 130 may be implemented in the form of a memory embedded in the electronic apparatus 100' or may be implemented in the form of a removable memory in the electronic apparatus 100' according to a data storage purpose. For example, data for driving the electronic apparatus 100' may be stored in a memory embedded in the electronic apparatus 100', and data for an extended function of the electronic apparatus 100' may be stored in the removable memory of the electronic apparatus 100'. In one or more examples, the memory embedded in the electronic apparatus 100' may be implemented as at least one of a volatile memory (e.g., dynamic RAM (DRAM), static RAM (SRAM), synchronous dynamic RAM (SDRAM), etc.), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). Furthermore, the removable memory of the electronic apparatus 100' may be implemented in the form of a memory card (e.g., compact flash (CF), secure digital (SD), micro secure digital (Micro-SD), mini secure digital (Mini-SD), xD (extreme digital), MMC (multi-media card), etc.), an external memory (e.g., USB memory) connectable to a USB port, etc.

According to one or more examples, the memory 130 may store at least one instruction or a computer program including instructions for controlling the electronic apparatus 100'.

According to one or more examples, the memory 130 may store an image received from an external device (e.g., a source device), an external storage medium (e.g., USB), an external server (e.g., a web hard), etc., that is, an input image, various data, information, etc.

According to one or more examples, the memory 130 may store various information that may be used in various embodiments of the present disclosure, such as predefined information about a first UI feedback, information about a second UI feedback, user information, operation history information, etc.

According to one or more embodiments, the memory 130 may be implemented as a single memory that stores data generated in various operations according to the present disclosure. However, according to one or more embodiments, the memory 130 may be implemented to include a plurality of memories respectively storing different types of data or data generated in different steps.

In the above-described embodiments, it has been described that various data are stored in the external memory 130 of the processor 120. However, as understood by one of ordinary skill in the art, at least part of the above-described data may be stored in an internal memory of the processor 120 according to one or more examples of at least one of the electronic apparatus 100' or the processor 120.

The communication interface 140 may be a component that communicates with an external device. For example, the communication interface 140 may receive image signals from an external device (e.g., a source device), an external storage medium (e.g., a USB memory), an external server (e.g., a web hard), etc. in a streaming or download method through a communication method such as AP-based Wi-Fi (Wi-Fi, Wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), optical, coaxial, etc. The image signal may be a digital image signal of any one of Standard Definition (SD), High Definition (HD), Full HD, and Ultra HD images, but is not limited thereto, and may include any other suitable resolution known to one of ordinary skill in the art. According to one or more embodiments, the communication interface 140 may receive a remote wheel input signal transmitted from an external wheel input device.

The user interface 150 may be implemented as a device such as buttons, a touch pad, a mouse, and a keyboard, or may be implemented as a touch screen capable of performing the above-described display function and manipulation input function together, a remote control transceiver, etc. The remote control transceiver may receive a remote control signal from an external remote control device or transmit a remote control signal through at least one of infrared communication, Bluetooth communication, or Wi-Fi communication. According to one or more embodiments, the remote control transceiver may receive a wheel input signal transmitted from an external remote controller.

The output unit 160 may output a sound signal. For example, the output unit 160 may convert a digital sound signal processed by the processor 120 into an analog sound signal, amplify the analog sound signal, and output the amplified sound signal. For example, the output unit 160 may include at least one speaker unit, a D/A converter, an audio amplifier, etc. configured to output at least one channel. According to one or more examples, the output unit 160 may be implemented to output various multi-channel sound signals. In this case, the processor 120 may control the output unit 160 to enhance and output the input sound signal so as to correspond to the enhancement processing of the input image. For example, the processor 120 may convert an input 2-channel sound signal into a virtual multi-channel (e.g., 5.1-channel) sound signal, recognize a location where the electronic apparatus 100' is placed, and process the location into a stereo sound signal optimized for the space, or provide a sound signal optimized according to the type of input image (e.g., content genre). According to one or more examples, the processor 120 may control the output unit 160 to output audio feedback corresponding to UI feedback, according to various embodiments.

The camera 170 may be turned on according to a preset event to perform photographing. The camera 170 may convert a captured image into an electrical signal and generate image data based on the converted signal. For example, an object may be converted into an electrical image signal through a charge coupled device (CCD), and the converted image signal may be amplified and converted into a digital signal and then signal processed. However, the camera 170 may not be included according to one or more examples of the electronic apparatus 100'.

The electronic apparatus 100' may additionally include a tuner and a demodulator according to an implementation example. A tuner may tune a channel selected by a user or all previously stored channels and receive a radio frequency (RF) broadcast signal among RF broadcast signals received through an antenna. The demodulator may receive and demodulate a digital IF signal (DIF) converted by the tuner, and perform channel decoding, etc.

Figure 3:
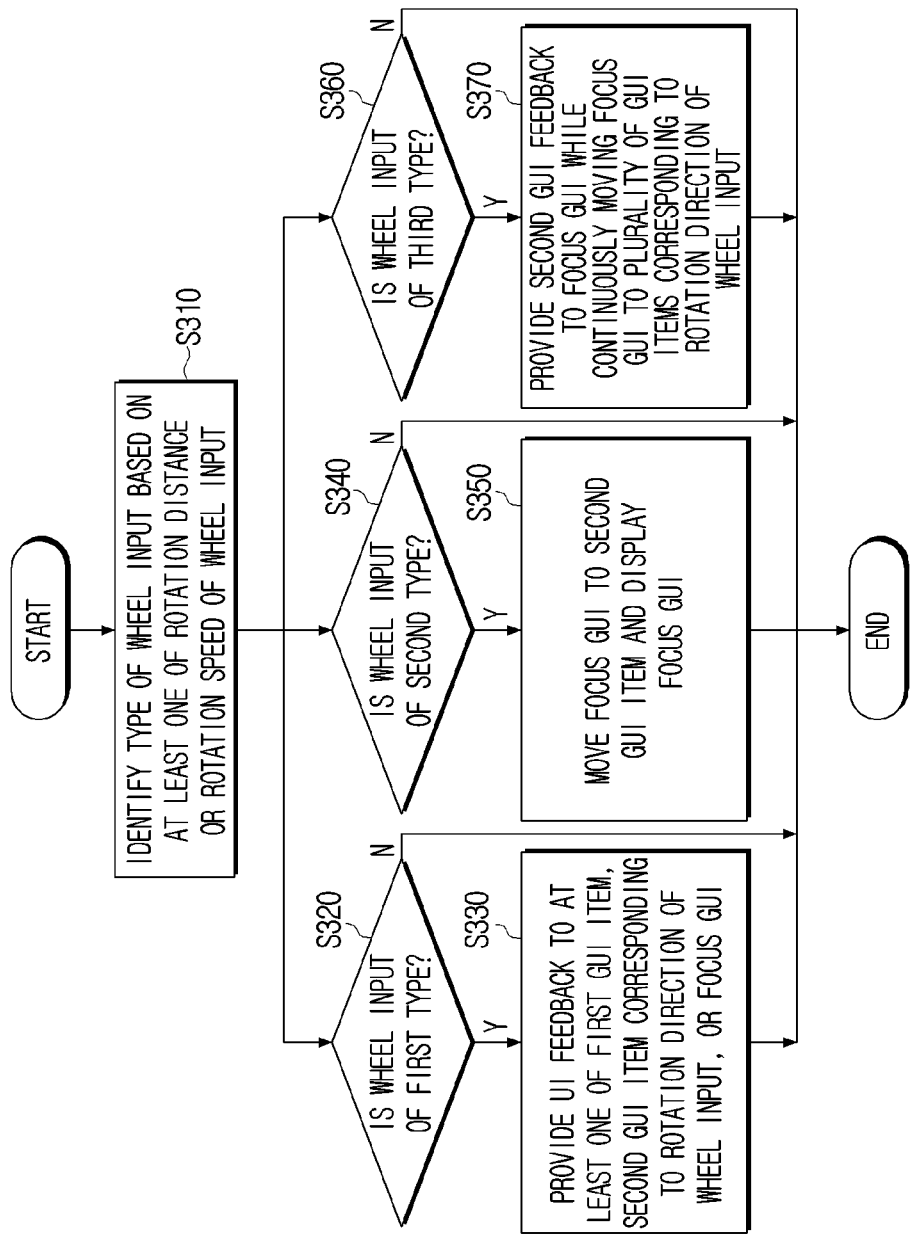
FIGS. 3 and 4 are diagrams for explaining a control operation according to a type of wheel input, according to one or more embodiments.

FIG. 3 is a diagram for explaining a control operation according to a type of wheel input according to one or more embodiments. The types of wheel inputs may be distinguished from each other based on a rotation distance and/or rotation speed of a wheel input. Based on the type of wheel input that is identified, a predetermined action by a processor or display device may be performed.

According to FIG. 3, the processor 120 may identify the type of wheel input based on at least one of a rotation distance or a rotation speed of the wheel input (S310).

When the wheel input is identified as being of a first type in step S310 (S320: Y), the processor 120 may control the display 110 to provide a first GUI item to at least one of a first GUI item, a second GUI item corresponding to a rotation direction of the wheel input, or a focus GUI (S330).

Figure 4:
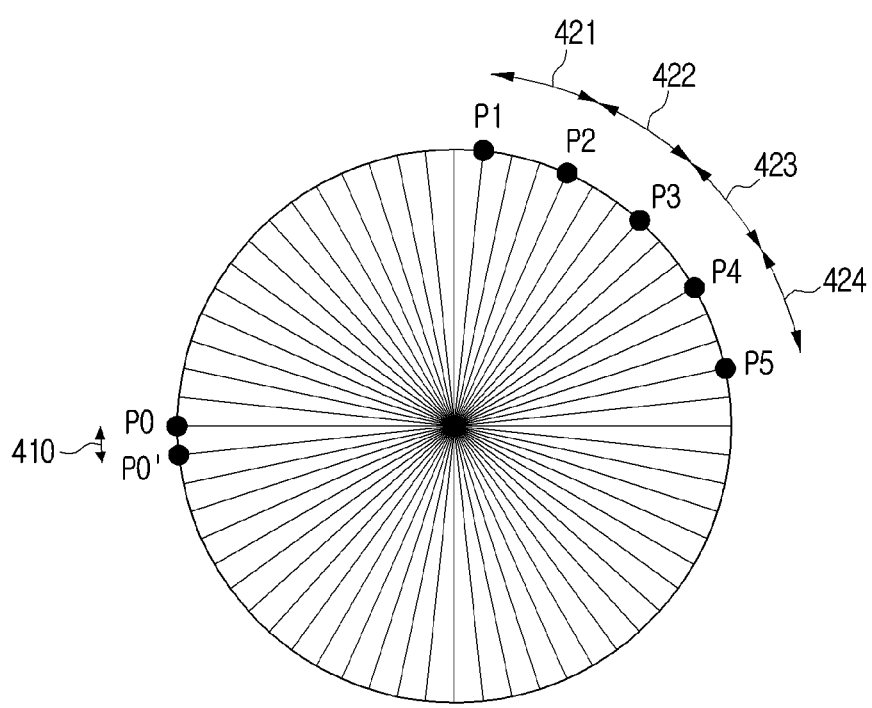

The first input type may be identified based on an event returning to a manipulation start point after a tick input less than a threshold number is generated. The tick input may be an input corresponding to a basic manipulation unit on at least one of a wheel button or a touch panel that receives the wheel input. For example, the tick input may be the minimum unit that may be recognized by hardware when each of the wheel input devices 10, 20, and 30 is implemented in hardware. The tick input may correspond, for example, to an instrument or object physically moving one space as shown in FIG. 4. The one space illustrated in FIG. 4 may correspond to the basic manipulation unit. In one or more examples, when each of the wheel input devices 10, 20, and 30 is implemented as software, the tick input may be the minimum movement unit defined by the software (e.g. P0 to P0').

Tick inputs corresponding to movement of a wheel that is greater than or equal to the threshold number are identified as the second input type, and may correspond to one key input in software (e.g., one direction key input on a remote controller). Accordingly, the first input type in which the tick input less than the threshold number is identified may be referred to as an input in which one key input is not completed in software, and may provide only a preset UI feedback, that is, the first UI feedback, rather than performing a specific function. Since the first input type is a case where the tick input less than the threshold number is identified, when the threshold number is 3, the first and second tick inputs may be identified as the first input type. According to one or more examples, the first input type may be named a tick input in the sense of a tick level input.

A first UI feedback may be provided in response to identification of the first input type. The first UI feedback may include at least one of feedback providing motion to the first GUI item, feedback changing the transparency of the focus GUI located on the first GUI item, feedback displaying a focus GUI of a preset transparency on the second GUI item, and/or feedback changing the size of the second GUI item.

According to one or more embodiments, the processor 120 may control the display 110 to provide, before a GUI action is performed, the first UI feedback when the wheel input is identified as being the first input type before. For example, the GUI action may correspond to the focus GUI horizontally moves from the first GUI item to the second GUI item, the focus GUI vertically moves from the first GUI item to the second GUI item, and/or a line break occurs while the focus GUI moves from the first GUI item to the second GUI item.

In step S310, when the wheel input is identified as being of the second type (S340: Y), the processor 120 may control the display 110 to move the focus GUI to the second GUI item corresponding to the rotation direction of the wheel input and display the focus GUI (S350).

The second input type may be identified based on determination of an event in which tick inputs equal to or greater than the threshold number are generated at a speed less than the threshold speed. In one or more examples, the threshold number may be the same as a threshold number used as criteria for identifying the first input type. For example, the tick input corresponding to the threshold number may be identified as being the second input type, and may correspond to one key input in software (e.g., one direction key input on a remote controller). For example, detection of a number of tick inputs corresponding to the threshold number may mean that the second input type is input once. Furthermore, detection of a number of tick inputs that corresponds to an integer multiple of the threshold number (e.g., * n) may mean that the second input type is input n times. For example, when the second input type is identified once, the focus GUI may be moved to the second GUI item, and when the second input type is identified once more (e.g., second input type is identified two consecutive times), the focus GUI may be moved again to a third GUI item adjacent to the second GUI item. For example, as shown in FIG. 4, when the threshold number is set to 3, three tick inputs may mean that the second input type is input once. For example, the movement of a rotary wheel from P1 to P2 (421), P2 to P3 (422), P3 to P4 (423), or P4 to P5 may each correspond to the second input type. According to one or more examples, the second input type may be referred to as a rotary input.

According to one or more embodiments, the rotation speed of the wheel input may be calculated as a value obtained by dividing the rotation distance of the wheel by a rotation time. The rotation time may correspond to the time to move a wheel from point A to point B. For example, the rotation distance of the wheel may be identified as a difference value between an angle corresponding to the current location of the wheel and an angle corresponding to an initial rotation start location. In one or more examples, the rotation distance of the wheel may be identified as a difference value between an angle corresponding to the current occurrence location of the second input type of the wheel and an angle corresponding to a first occurrence location of the second input type.

In step S310, when the wheel input is identified as being of the third type (S360: Y), the processor 120 may control the display 110 to provide the second GUI feedback to the focus GUI, while continuously moving the focus GUI to the plurality of GUI items corresponding to the rotation direction of the wheel input (S370). The third input type may be identified based on an event in which tick inputs equal to or greater than the threshold number are generated. In one or more examples, the threshold number may be the same as the threshold number used as a criterion for identifying the first input type and the second input type, and the threshold speed may be the same as the threshold speed used as a criterion for identifying the second input type. For example, the processor 120 may identify that the third input type is generated when a plurality of second input type (or a plurality of first input type) are continuously generated at the threshold speed or higher.

The second UI feedback may include feedback changing the transparency of the focus GUI, and continuously moving the focus GUI to the plurality of GUI items corresponding to the rotation direction of the wheel input.

According to one or more embodiments, when the wheel input is identified as being of the second input type, the processor 120 may control the display 110 to increase the size of the second GUI item on which the focus GUI is located while moving and displaying the focus GUI to the second GUI item. In one or more examples, when the wheel input is identified as being of the third input type, the processor 120 may control the display 110 to continuously move the focus GUI to the plurality of GUI items corresponding to the rotation direction of the wheel input so that the size of the GUI item on which the focus GUI is located is maintained.

According to one or more examples, the processor 120 may enter a continuous key mode when the wheel input is identified as being of the third input type. Furthermore, the processor 120 may release the continuous key mode when the wheel input is not identified as being the third input type for a threshold time in the continuous key mode. The continuous key mode may mean a mode in which the size of the GUI item in which the focus GUI is located is maintained while continuously moving the focus GUI to the plurality of GUI items corresponding to the rotation direction of the wheel input as the wheel input is identified as being of the third type. The threshold time may be a preset time when the electronic apparatus 100 or 100' is manufactured, but is not necessarily limited thereto, and may be set/changeable according to a user command. According to one or more examples, in the continuous key mode, the focus GUI may be continuously moved while the size of the GUI item is maintained and the transparency of the focus GUI is changed.

Figure 5:
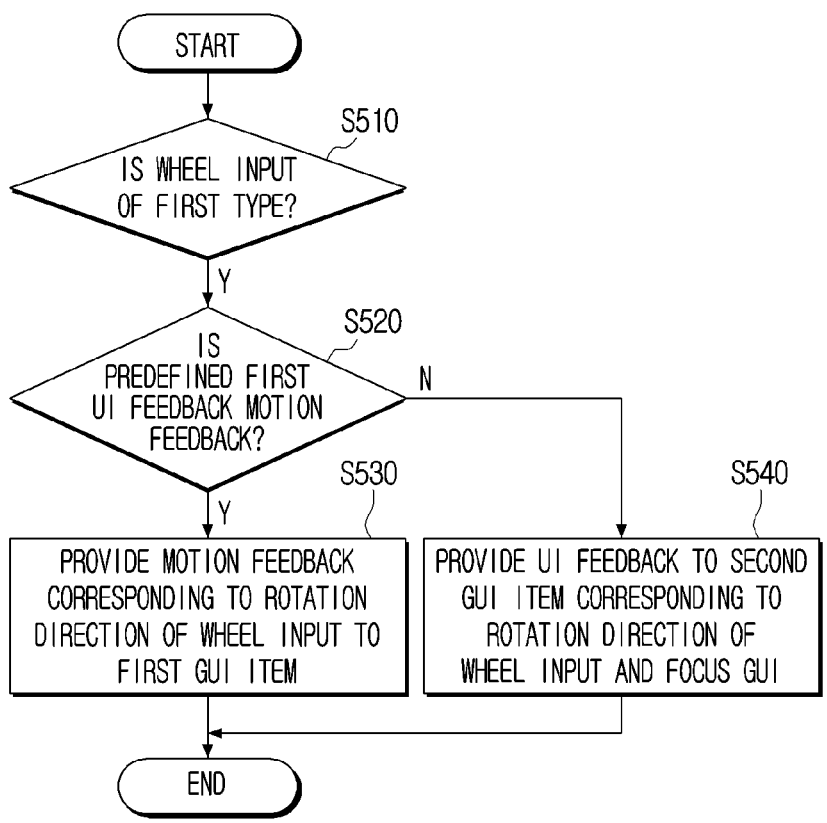
FIG. 5 is a diagram for explaining a control operation according to a first input type, according to one or more embodiments.

FIG. 5 is a diagram for explaining a control operation according to a first input type according to one or more embodiments.

According to FIG. 5, when a wheel input is identified as being of the first type (S510), the processor 120 identifies whether a predefined first UI feedback corresponding to the first type is a motion providing feedback (S520). The predefined first UI feedback may be previously set at the time of manufacturing the electronic apparatus 100 or may be set/changeable by a user.

According to one or more examples, the first UI feedback may be set to a different form (e.g., a motion (or dynamic) feedback, a static feedback, etc.) according to various properties such as the type of UI screen, for example, the size of the UI screen, the size of the GUI item, the type of the GUI item, the depth of the GUI item, spaces between GUI items, etc. However, the predefined first UI feedback is not limited thereto, and may be set differently based on various types of information such as the type of application providing the UI screen, setting information (e.g., screen brightness), viewing environment (e.g., current time, and ambient light), user information, etc. For example, when the brightness of the screen is too bright, a change in transparency of the focus GUI may not be well recognized by the user, and thus, the predefined first UI feedback may be set to provide the motion feedback.

The motion feedback may be feedback providing a motion corresponding to a rotation direction of a wheel input to a GUI item where the focus GUI is located. For example, the motion feedback may be feedback in which a corresponding GUI item is tilted in a movement direction corresponding to the rotation direction of the wheel input and then returns.

When the predefined first UI feedback is the motion providing feedback (S520:Y), the processor 120 may provide the motion feedback corresponding to the rotation direction of the wheel input to the first GUI item (S530). In this case, the motion feedback may be feedback in which the first GUI item is tilted by a preset angle in the wheel rotation direction so as not to overlap the second GUI item adjacent to the first GUI item. However, when the distance between the GUI items is not wide enough to provide the motion feedback of the preset angle, the first GUI item may be tilted so as to partially overlap the second GUI item adjacent to the first GUI item. In this case, the overlapping part may be displayed to have preset transparency. Alternatively, the angle corresponding to the motion feedback may be automatically adjusted according to the distance between the GUI items.

When the predefined first UI feedback is not the motion providing feedback (S520:N), the processor 120 may provide the static feedback to the second GUI item corresponding to the rotation direction of the wheel input and the focus GUI (S540). The static feedback may be named for convenience to be distinguished from the motion feedback, and may mean providing various visual feedbacks to the first GUI item, the second GUI item, and the focus GUI. According to one or more examples, the static feedback may include feedback maintaining the size of the second GUI item corresponding to the rotation direction of the wheel input, and providing a part of the entire transparency of the focus GUI to the second GUI item, feedback changing the size of the second GUI item corresponding to the rotation direction of the wheel input and providing a part of the entire transparency of the focus GUI to the second GUI item, feedback changing the size of the second GUI item corresponding to the rotation direction of the wheel input, etc.

Although it has been described in FIG. 5 that the processor 120 identifies whether the predefined first UI feedback is the motion feedback, and provides the static feedback when the predefined first UI feedback is not the motion feedback, this operation is for convenience of description, and the processor 120 may identify the predefined first UI feedback based on various information such as the application type, the setting information (e.g., screen brightness), the viewing environment (e.g., the current time and ambient illumination), the user information, etc.

FIGS. 6A to 6D are diagrams for explaining various examples according to a first input type.

FIGS. 6A to 6D illustrate, for convenience, that a plurality of GUI items are arranged in a horizontal direction and a focus GUI is located on a first GUI item among the plurality of GUI items. However, as understood by one of ordinary skill in the art, the arrangement direction of the plurality of GUI items may vary, such as vertical and diagonal directions, and the focus GUI may also be located on a GUI item other than the first GUI item. In addition, the focus GUI is shown highlighted on the edge of the GUI item, and the GUI item where the focus GUI is located is shown as having a relatively large size compared to other GUI items. The focus GUI is not necessarily limited thereto to this configuration, and may be modified as understood by one of ordinary skill in the art. For example, the focus GUI may be highlighted on the entire GUI item, or only on a part of the edge region of the GUI item.

Figure 6A:
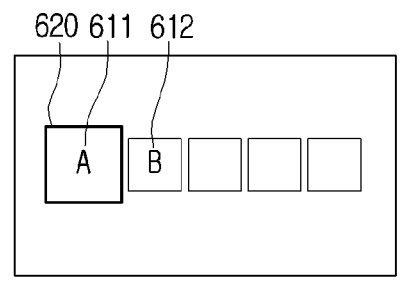
FIGS. 6A to 6D are diagrams for explaining various examples according to a first input type, according to one or more embodiments.
Figure 6A:
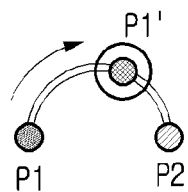
Figure 6A:
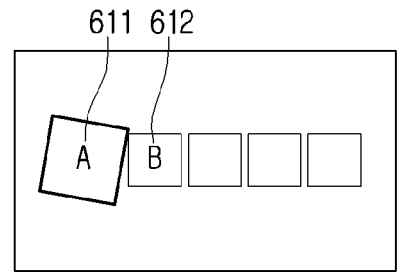
Figure 6A:
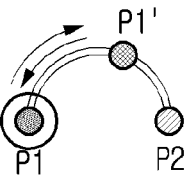
Figure 6A:
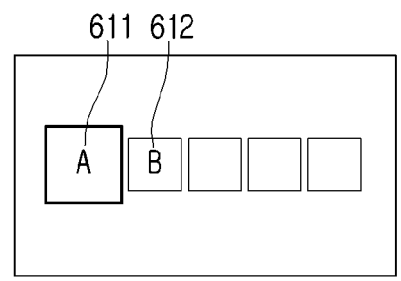

Referring to FIG. 6A, according to one or more examples, when the first input type in the right direction is identified in a state where a focus GUI 620 is located on a first GUI item 611, the processor 120 may provide a motion feedback in which the first GUI item 611 is tilted to the second GUI item 612 located in the right direction and then returns to the original state. In this case, the motion feedback may be feedback in which the first GUI item 611 is tilted by a preset angle in the wheel rotation direction so as not to overlap the second GUI item 612 adjacent to the first GUI item 611. However, when the distance between the GUI items is not wide enough to provide the motion feedback of the preset angle, the first GUI item 611 may be tilted so as to partially overlap the second GUI item 612 adjacent to the first GUI item. In this case, the overlapping part may be displayed to have a preset transparency so as not to block the view of the overlapped GUI item. In one or more examples, the angle corresponding to the motion feedback may be automatically adjusted so that the GUI items do not overlap according to the distance between the GUI items.

For example, when the processor 120 identifies a tick input in which a wheel rotates from a point P1 to a point P2 of a wheel input device and then returns to the point P1, the processor 120 may provide the corresponding motion feedback. When the wheel rotates from the point P1 to the point P2, the tick input may be identified as a second input type, but since the wheel returns to the point P1 before reaching the point P2 (e.g., the wheel reaches only P1'), the corresponding input is identified as the tick input.

Figure 6B:
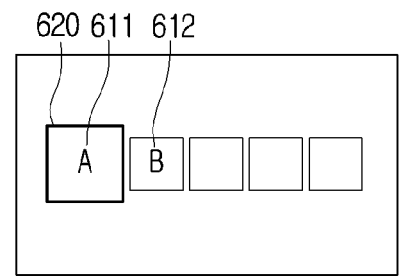
Figure 6B:
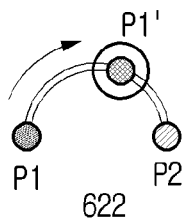
Figure 6B:
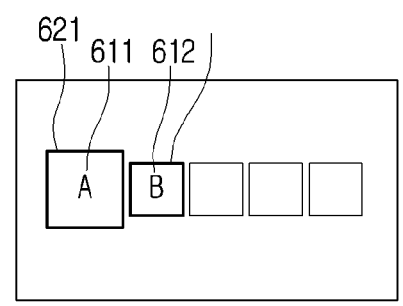
Figure 6B:
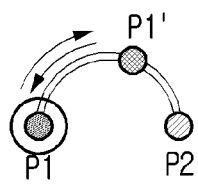
Figure 6B:
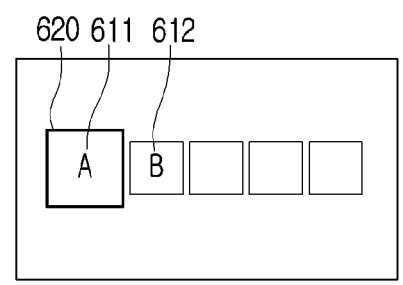

Referring to FIG. 6B, according to one or more examples, when the first input type in the right direction is identified in a state where the focus GUI 620 is located on the first GUI item 611, the processor 120 may provide a feedback displaying the focus GUI 620 by maintaining only 50% (621) of the transparency of the focus GUI 620 on the first GUI item 611, and moving 50% (622) of the transparency of the focus GUI 620 to the second GUI item 612.

However, according to one or more examples, it is also possible to adjust the transparency based on the relative location of a rotational point of the wheel between the point P1 and the point P2. For example, when the first input type is input to a point relatively closer to the point P2 than to the point P1, the processor 120 may assign a relatively higher value to the second GUI item 612 than to the first GUI item 611 as the transparency of the focus GUI 620. For example, the processor 120 may display the focus GUI 620 by maintaining 30% of the transparency of the focus GUI 620 on the first GUI item 611 and moving the remaining 70% of the transparency of the focus GUI 620 to the second GUI item 612. High transparency may mean that the focus GUI 620 may be displayed more brightly. For example, high transparency may mean higher highlight property.

Figure 6C:
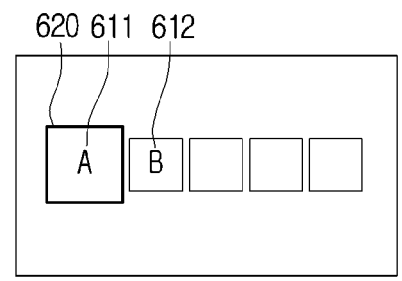
Figure 6C:
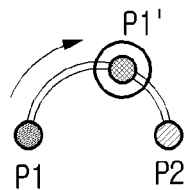
Figure 6C:
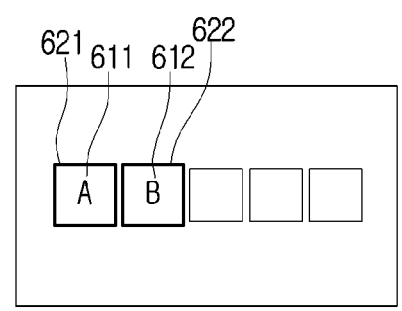
Figure 6C:
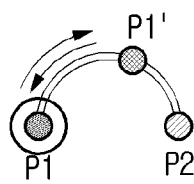
Figure 6C:
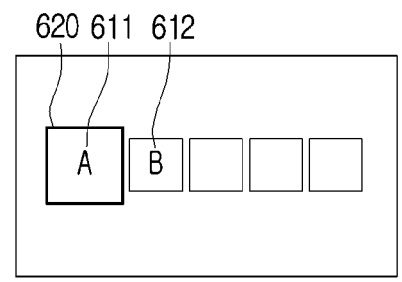

Referring to FIG. 6C, according to one or more examples, when the first input type in the right direction is identified in a state where the focus GUI 620 is located in the first GUI item 611, the processor 120 may adjust the size of the second GUI item 612 by changing the transparency of the focus GUI 620 as shown in FIG. 6B. For example, as shown in FIG. 6C, the processor 120 may adjust the size of the second GUI item 612 to be the same size as that of the first GUI item 611, but is not necessarily limited thereto.

However, according to one or more examples, it is also possible to adjust the size based on the relative location of the rotational point of the wheel between the point P1 and the point P2. For example, when the first input type is input to a point relatively closer to the point P2 than the point P1, the processor 120 may adjust the size of the second GUI item 612 to be the same as the size of the first GUI item 611, and when the first input type is input to a point relatively closer to the point P1 than the point P2, the processor 120 may adjust the size of the second GUI item 612 to be smaller than the size of the first GUI item 611. In this case, the sizes of the first GUI item 611 and the second GUI item 612 may be adjusted so that the first GUI item 611 and the second GUI item 612 do not overlap each other.

Figure 6D:
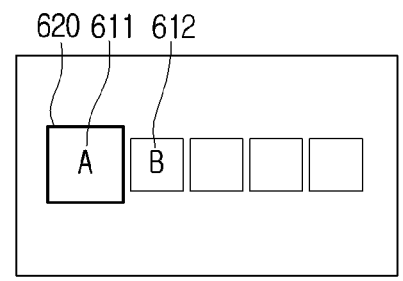
Figure 6D:
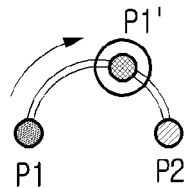
Figure 6D:
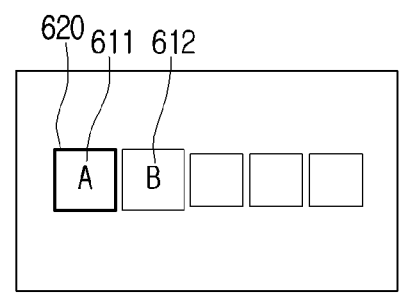
Figure 6D:
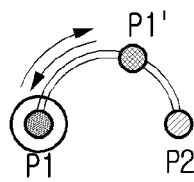
Figure 6D:
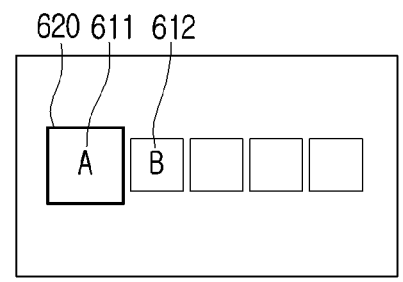

Referring to FIG. 6D, according to one or more examples, when the first input type in the right direction is identified in a state where the focus GUI 620 is located on the first GUI item 611, the processor 120 may adjust the size of the second GUI item 612 in a similar manner to FIG. 6C, but maintain the transparency of the focus GUI 620 as unchanged.

The above-described first UI feedback may be set when the electronic apparatus 100 is manufactured or may be set/changeable according to a user command. Furthermore, the first GUI feedback may be set in various forms based on various information such as the type of UI screen, an application type, a current time, a user, etc., or may be set/changeable by combining some information. For example, when a first GUI feedback preset with respect to the type of UI screen is a motion feedback, and a first GUI feedback preset with respect to a first user is a static feedback, it is also possible to provide both the motion feedback according to FIG. 6A and the static feedback according to FIG. 6B at the same time.

Also, according to one or more embodiments, the processor 120 may provide the first UI feedback in a different form whenever the first input type is identified. For example, the processor 120 may provide the motion feedback according to FIG. 6A with respect to a first input of the first type, and the static feedback according to FIG. 6B with respect to a second input of the first type.

Figure 7:
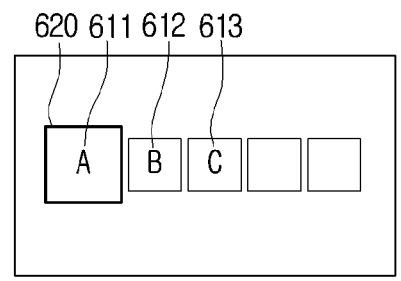
FIG. 7 is a diagram for explaining various examples according to a second input type, according to one or more embodiments.
Figure 7:
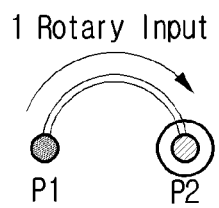
Figure 7:
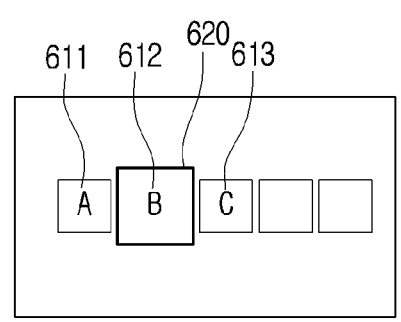
Figure 7:
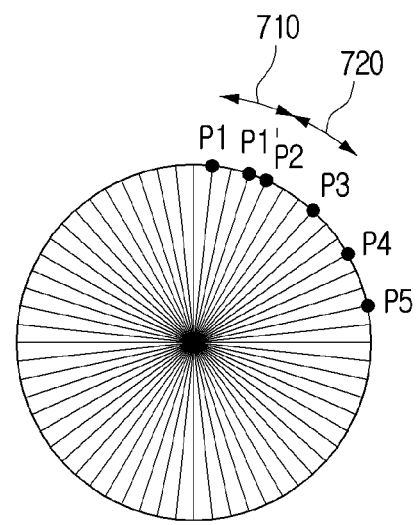
Figure 7:
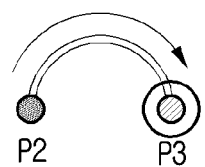
Figure 7:
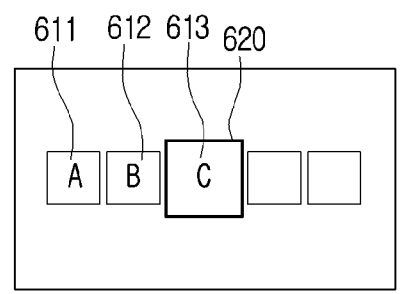

FIG. 7 is a diagram for explaining various examples according to a second input type.

According to one or more embodiments, when the second input type in the right direction is identified once in a state where the focus GUI 620 is located on the first GUI item 611, the processor 120 may expand the size of the second GUI item 612 and return the size of the first GUI item 611 to its original state while moving the focus GUI 620 to the second GUI item 612 located in the right direction and displaying the focus GUI 620. For example, as shown in FIG. 7, when three ticks are defined as the second input type, each of P1 to P2, P2 to P3, P3 to P4, and P4 to P5 may correspond to the second input type. Accordingly, when a wheel rotates 710 from the point P1 to the point P2, the processor 120 may move the focus GUI 620 from the first GUI item 611 to the second GUI item 612 and display the focus GUI 620, and when rotating 720 again from the point P2 to a point P3, the processor 120 may move the focus GUI 620 from the second GUI item 612 to a third GUI item 613 and display the focus GUI 620. In this case, as shown in FIG. 7, the size of the GUI item where the focus GUI 620 is located may be adjusted to be larger than other GUI items and displayed.

Returning to FIG. 2, according to one or more embodiments, when the second input type may be identified while content is being played back through the display 110, the processor 120 may identify a threshold number corresponding to the second input type as different values so as to be in inverse proportion to the length of the content.

For example, the processor 120 may identify the threshold number as a first number when the content length is less than a first threshold length, identify the threshold number as a second number when the content length is greater than or equal to the first threshold length and less than the second length, and, when the content length is greater than or equal to the second length, identify the threshold number as a third number. However, while this case has a content length that is divided into 3 sections, the content length may be divided into 2 sections or may be divided into 4 or more sections in other examples.

According to one or more examples, even when the threshold number corresponding to the second type is identified as different values so as to be in inverse proportion to the length of the content, the processor 120 may change the threshold number for each section of the content. For example, the processor 120 may adaptively adjust the threshold number in a corresponding section based on a manipulation history of the user and the importance (e.g., repetition of the previous episode, notice of the next episode, etc.) of content inserted in the initial or end part of the content.

Figure 8:
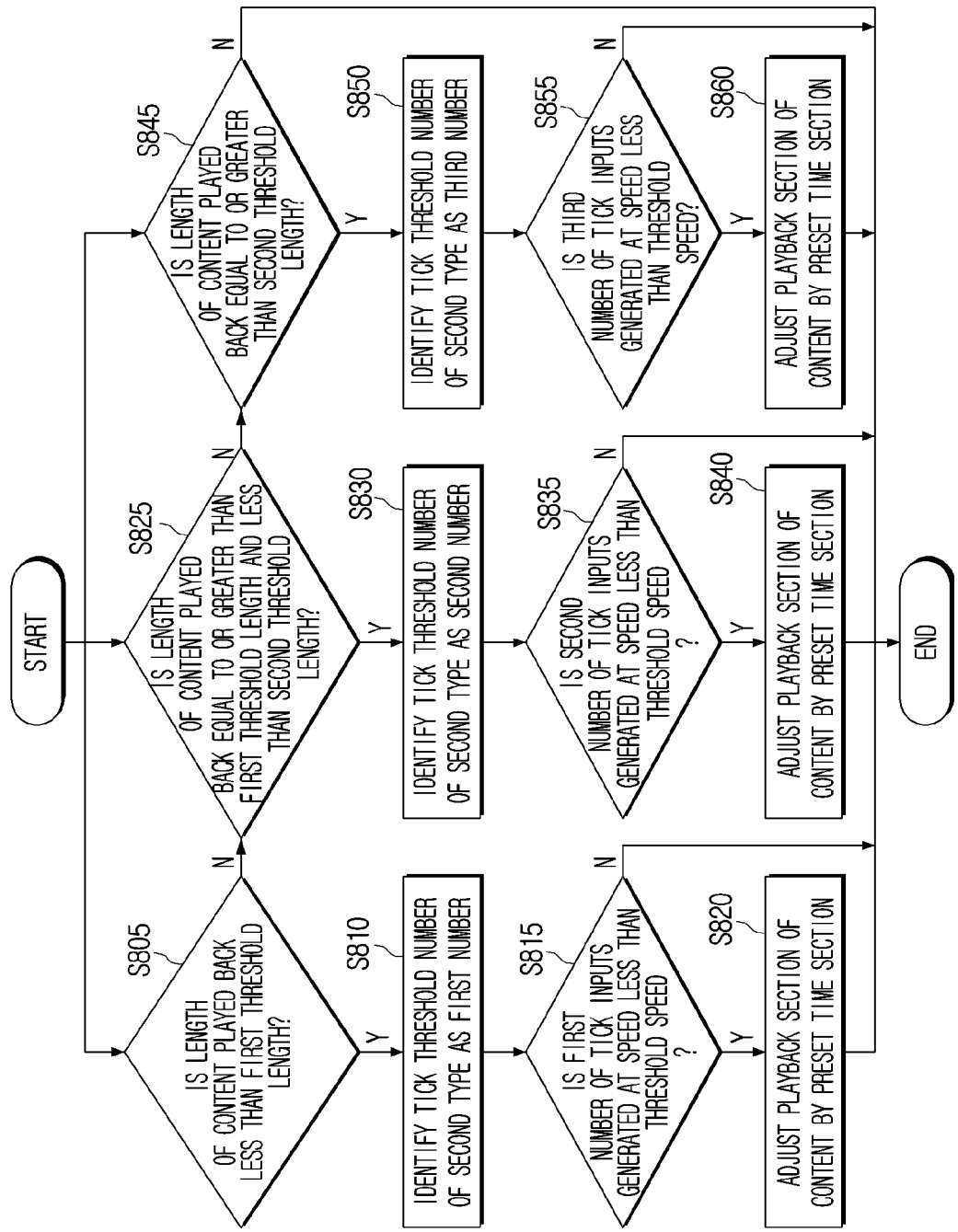
FIGS. 8 and 9 are diagrams for explaining a method of setting a threshold number of a second input type according to content length, according to one or more embodiments.
Figure 9:
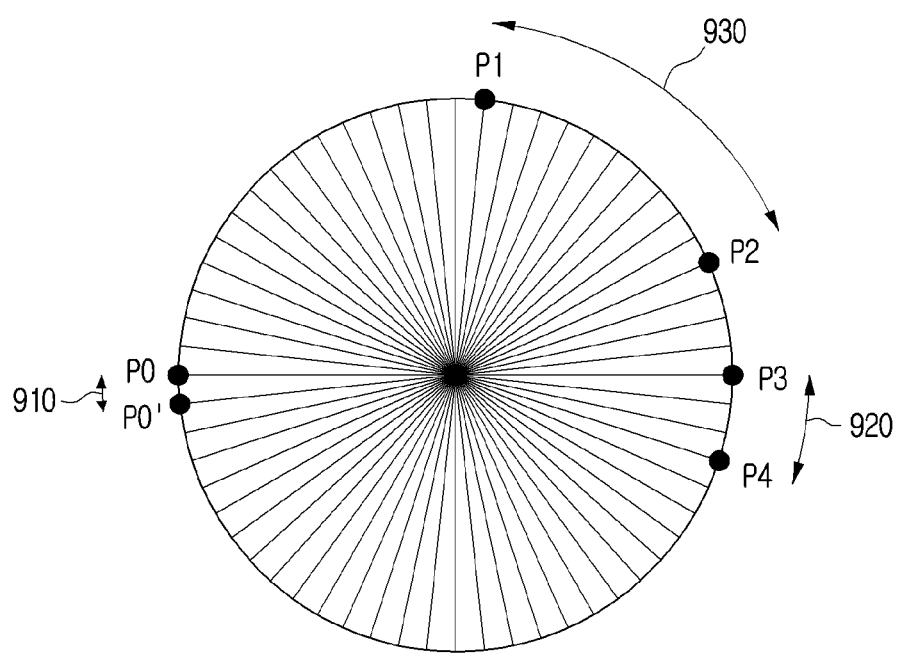

FIGS. 8 and 9 are diagrams for explaining a method of setting a threshold number of a second input type according to a content length.

Referring to FIG. 8, when the processor 120 identifies that the entire length of content played back through the display 110 is less than the first threshold length (S805: Y), the processor 120 may identify the tick threshold number for the second input type as the first number (S810). Next, when the first number of tick inputs is generated (S815), the processor 120 may adjust the playback section of content by a preset time section (S820). For example, the first number of tick inputs (one second input type) may be one key input in software, for example, a specific button (e.g., a playback button) of a remote controller is input once so that the processor 120 may perform the same function as a function of moving a preset section.

When the entire length of the content played back through the display 110 is not less than the first threshold length (S805: N), the processor 120 may identify whether the entire length of the content is equal to or greater than the first threshold length and less than the second threshold length (S825). When the entire length of the content is identified to be greater than or equal to the first threshold length and less than or equal to the second threshold length (S825:Y), the processor 120 may identify the tick threshold number of the second type as the second number (S830). Subsequently, when the second number of tick inputs is generated (S835), the processor 120 may adjust the playback section of content by a preset time section (S840).

When the entire length of the content is equal to or greater than the second threshold length (S825:N), the processor 120 identifies whether the entire length of the content is greater than or equal to the second threshold length (S845). When the entire length of the content is identified to be greater than or equal to the second threshold length (S845: Y), the processor 120 may identify the tick threshold number of the second input type as the third number (S850). Subsequently, when the third number of tick inputs is generated (S855), the processor 120 may adjust the playback section of the content by a preset time section (S860). For example, the processor 120 may move the same playback time (e.g., 1 second) based on a different number of tick inputs according to the entire length of the content.

As described above, the processor 120 may determine the threshold number of the second input type as the first number when the entire length of first content is less than the first threshold length. The processor 120 may determine the threshold number of the second input type as the second number when the entire length of the second content is greater than or equal to the first threshold length and less than the second threshold length. The processor 120 may determine the threshold number of the second input type as the third number when the entire length of the third content is greater than or equal to the second threshold length. The second number may be greater than the third number and smaller than the first number. Thus, the magnitude of the threshold number is inversely proportional to the content length.

According to one or more examples, as shown in FIG. 9, the processor 120 may set the threshold number to a first number 910, for example, 1 (e.g., 1 tick) when the entire length of the first content is less than the first threshold length. As illustrated in FIG. 9, the processor 120 may set the threshold number to a second number 920, for example, 3 (e.g., 3 ticks) when the entire length of the second content is greater than or equal to the first threshold length and less than the second threshold length. As illustrated in FIG. 9, the processor 129 may set the threshold number to a third number 930, for example, 10 (e.g., 10 ticks) with respect to the third content having the entire length equal to or greater than the second threshold length. In this case, in the case of the first content, the playback section is moved by 1 second for every 1 tick input, in the case of the second content, the playback section is moved by 1 second every 3 tick inputs, and in the case of the third content, the playback section is moved by 1 second every 10 tick inputs.

However, in FIG. 9, it has been described that the processor 120 sequentially determines whether the entire length of the content is less than the first threshold length, whether the content is greater than or equal to the first threshold length and less than the second threshold length, and whether the content is greater than or equal to the second threshold length. However, this operation is for convenience of description, and the entire length of the content may be immediately identified based on meta data, etc.

Figure 10A:
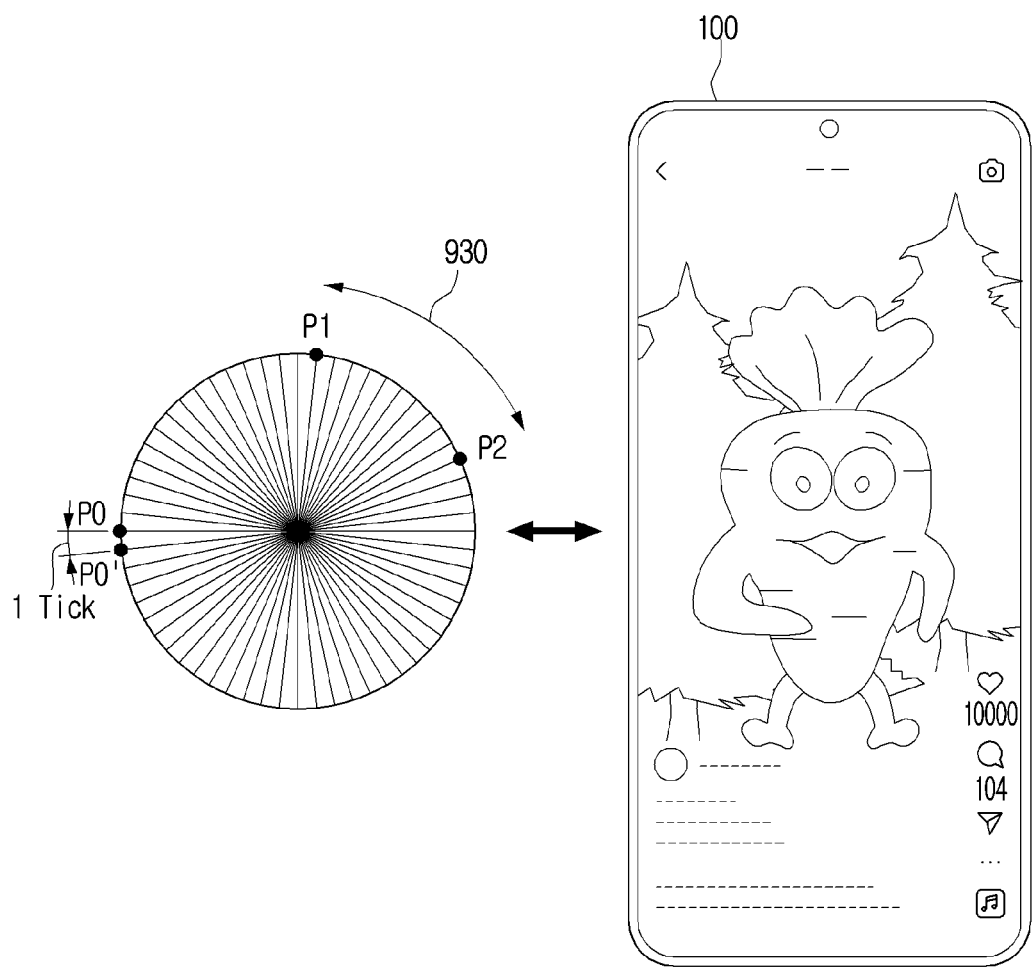
FIGS. 10A to 10C are diagrams for explaining a method of adjusting a content playback section, according to one or more embodiments.
Figure 10B:
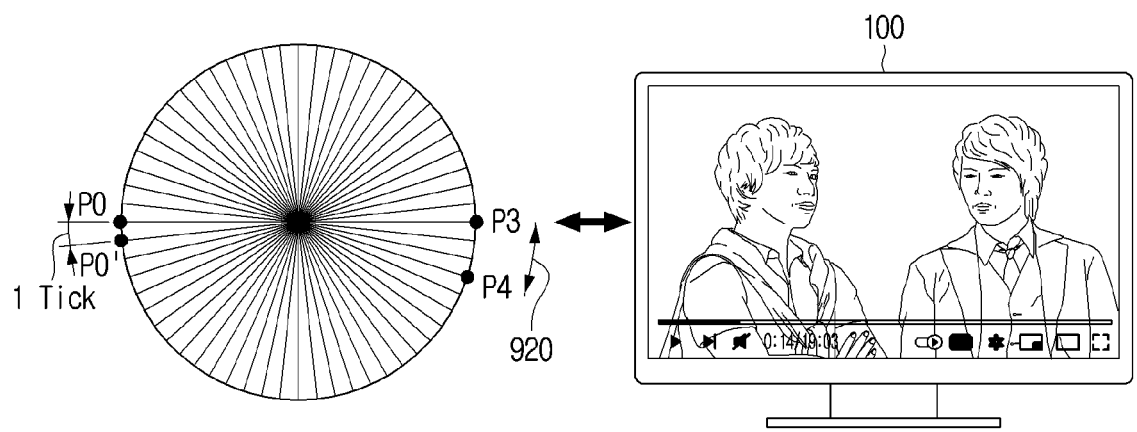
Figure 10C:
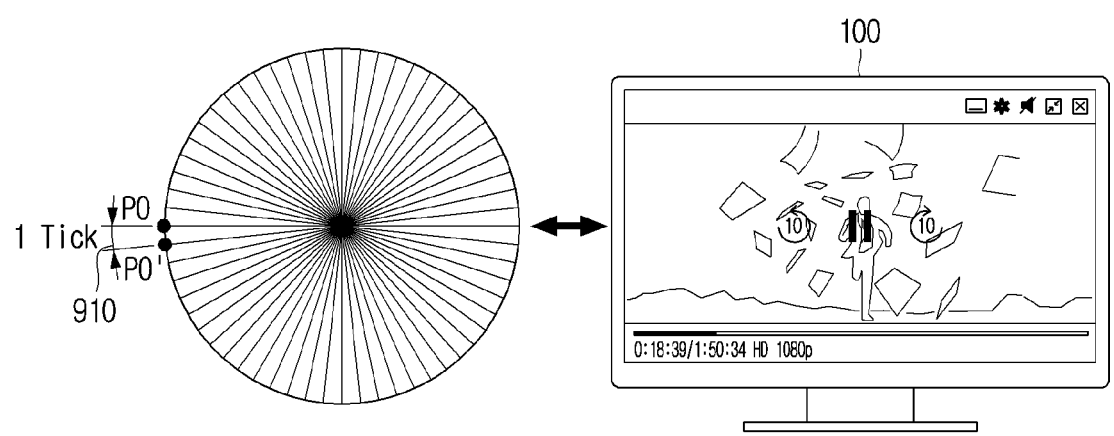

FIGS. 10A to 10C are diagrams for describing a method of adjusting a content playback section according to one or more embodiments.

Referring to FIG. 10A, according to one or more examples, a video (e.g., within 10 minutes at the longest) with a running time of mainly 15 seconds to 1 minute, such as tick tock, shorts, reels, fast rap, etc., may be classified as short-form, and therefore, a threshold number N may be set to 10. In this case, 10 ticks may be set as one rotary input 930, and a playback section may be moved by 1 second each time the one rotary input 930 occurs (e.g., rotary wheel is moved 10 ticks). This configuration prevents the playback time from being unintentionally changed a lot at once because the length of the video is short.

Referring to FIG. 10B, according to one or more examples, a content (e.g., a content having a length between 20 to 40 minutes) longer than 10 minutes such as YouTube content and web drama may be classified as mid-form, and therefore, the threshold number N may be set to 3. In this case, 3 ticks may be set as one rotary input 920, and the playback section may be moved by 1 second each time the one rotary input 920 occurs (e.g., rotary wheel is moved 3 ticks). In this case, it is possible to provide an experience similar to a general image manipulation (e.g., image is updated while the rotary wheel is moved every 3 ticks).

Referring to FIG. 10C, according to one or more examples, general legacy media (e.g., a content longer than 1 hour) such as movie and drama may be classified as long-form, and therefore, the threshold number N may be set to 1. In this case, 1 tick is set as one rotary input 910, and the playback section may be moved by 1 second each time the one rotary input 910 occurs (e.g., rotary wheel is moved 1 tick). In this case, in accordance with the length of a video, quick manipulation (e.g., scrolling through content quickly) and fine adjustment (e.g., scrolling through a small amount of content for each tick) for each section are possible.

As described above, it is possible to provide a manipulation experience suitable for the user's intention by adjusting one or more thresholds according to the length of the content. For example, for the longer the content, the more sensitive feedback becomes based on movement of a wheel (e.g., when it is defined as 1 Rotary Input=N Tick, an N value decreases), and the shorter the length of the content, the less sensitive feedback becomes based on movement of the wheel (e.g., when it is defined as 1 Rotary Input=N Tick, the N value increases).

According to one or more embodiments, even when the threshold number is set according to the length of the content, it is possible to temporarily adjust the threshold number in some sections according to a user command or a section type of the content. For example, even when the threshold number of content is set to 3 in the embodiment of FIG. 10B, the threshold number may be automatically changed to a value smaller than 3 in the initial section and the end section of the content. According to one or more examples, the processor 120 may determine whether to adjust the threshold number based on the manipulation history information of the user. For example, when there is a high tendency to quickly adjust a wheel input in the initial section and the last section of the content, the processor 120 may adaptively change the threshold number to a value smaller than 3 in the corresponding section, thereby enabling faster adjustment in the corresponding section than in other sections.

Figure 11:
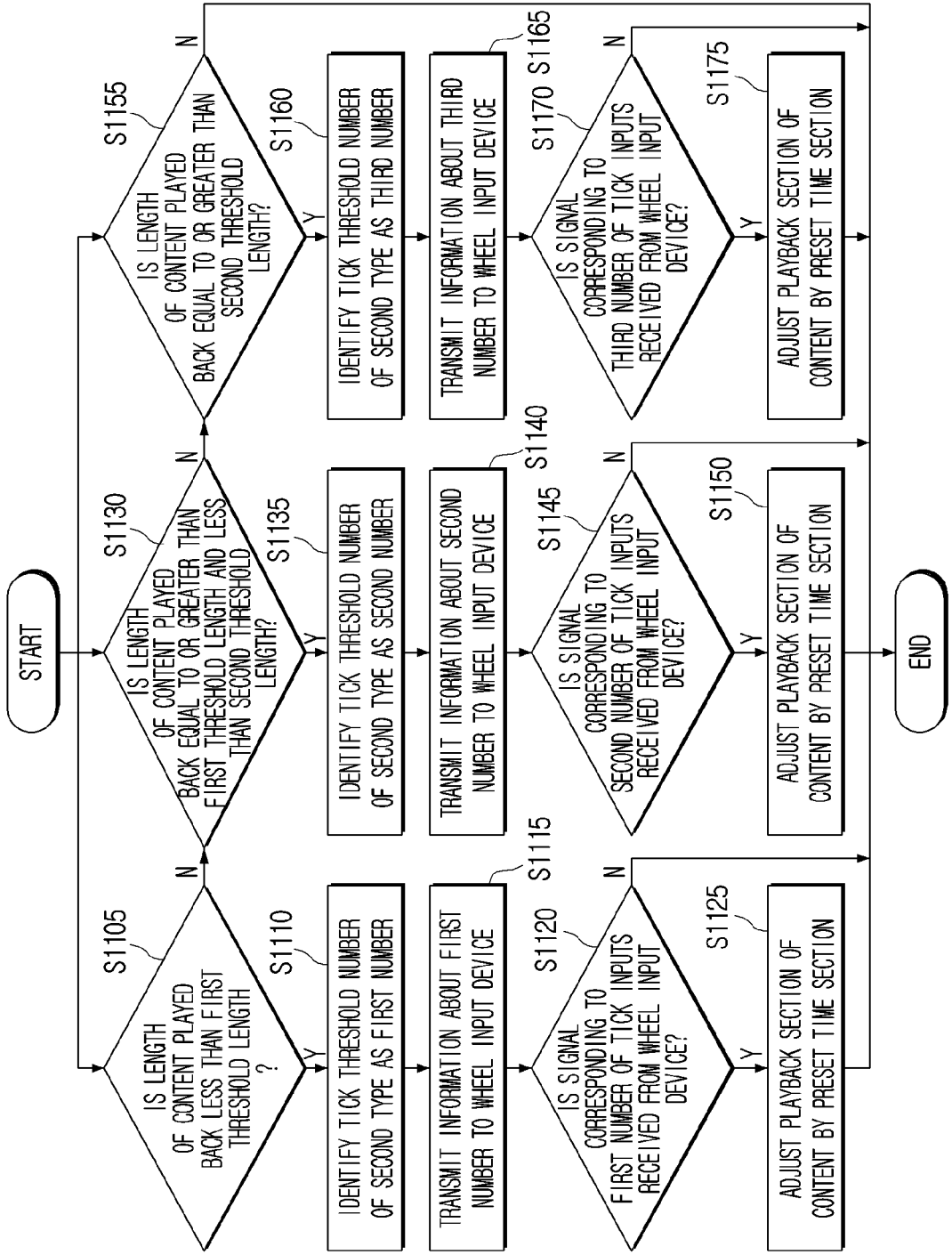
FIG. 11 is a diagram for explaining a method of adjusting a content playback section, according to one or more embodiments.

FIG. 11 is a diagram for explaining a method of adjusting a content playback section, according to one or more embodiments.

In FIG. 11, for convenience of description, a case in which a wheel input device is implemented as an external device of the electronic apparatus 100 will be described. However, as understood by one of ordinary skill in the art, the process illustrated in FIG. 11 may be performed for a wheel input device that is part of the electronic apparatus 100.

Referring to FIG. 11, when the processor 120 identifies that the entire length of the content played back through the display 110 is less than the first threshold length (S11005: Y), the processor 120 may identify the tick threshold number of the second input type as the first number (S1110). Subsequently, the processor 120 may transmit information about the first number to the wheel input device (S1115). Thereafter, when a signal corresponding to the first number of tick inputs is received from the wheel input device (S1120: Y), the processor 120 may adjust the playback section of the content by a preset time section (S1125).

When the entire length of the content played back through the display 110 is not less than the first threshold length (S1105: N), the processor 120 identifies whether the entire length of the content is equal to or greater than the first threshold length and less than the second threshold length (S1130). When the entire length of the content is identified to be greater than or equal to the first threshold length and less than or equal to the second threshold length (S1130:Y), the processor 120 may identify the tick threshold number of the second type as the second number (S1135). Subsequently, the processor 120 may transmit information about the second number to the wheel input device (S1140). Thereafter, when a signal corresponding to the second number of tick inputs is received from the wheel input device (S1145: Y), the processor 120 may set the playback section of the content by a preset time section (S1150).

When the entire length of the content is equal to or greater than the second threshold length (S1130: N), the processor 120 identifies whether the entire length of the content is greater than or equal to the second threshold length (S1150). When the entire length of the content is identified to be greater than or equal to the second threshold length (S1150: Y), the processor 120 may identify the tick threshold number of the second input type as the third number (S1155). Subsequently, the processor 120 may transmit information about the third number to the wheel input device (S1160). Thereafter, when a signal corresponding to the second number of tick inputs is received from the wheel input device (S1165: Y), the processor 120 may set the playback section of the content by a preset time section (S1170). For example, as described above, the processor 120 may transmit information about the identified threshold number to the wheel input device, and whenever a signal corresponding to the threshold number is received from the wheel input device, may set the playback section of the content by a preset time section.

Furthermore, descriptions of the length of the content, the first number, the second number, and the third number are the same as/similar to those described in FIG. 8, and thus, detailed descriptions thereof will be omitted.

Referring back to FIG. 2, according to one or more embodiments, when a wheel input is identified while a continuous adjustment UI having an adjustable range is provided through the display 110, the processor 120 may identify a threshold number corresponding to the second input type as one of different values so as to be in inversely proportion to the length of the adjustable range. The continuous adjustment UI may refer to a UI having a preset adjustment range and configured to be continuously adjusted, such as a UI for adjusting volume, screen brightness, contrast, backlight brightness, light bulb brightness, air conditioner temperature, etc.

Figure 12:
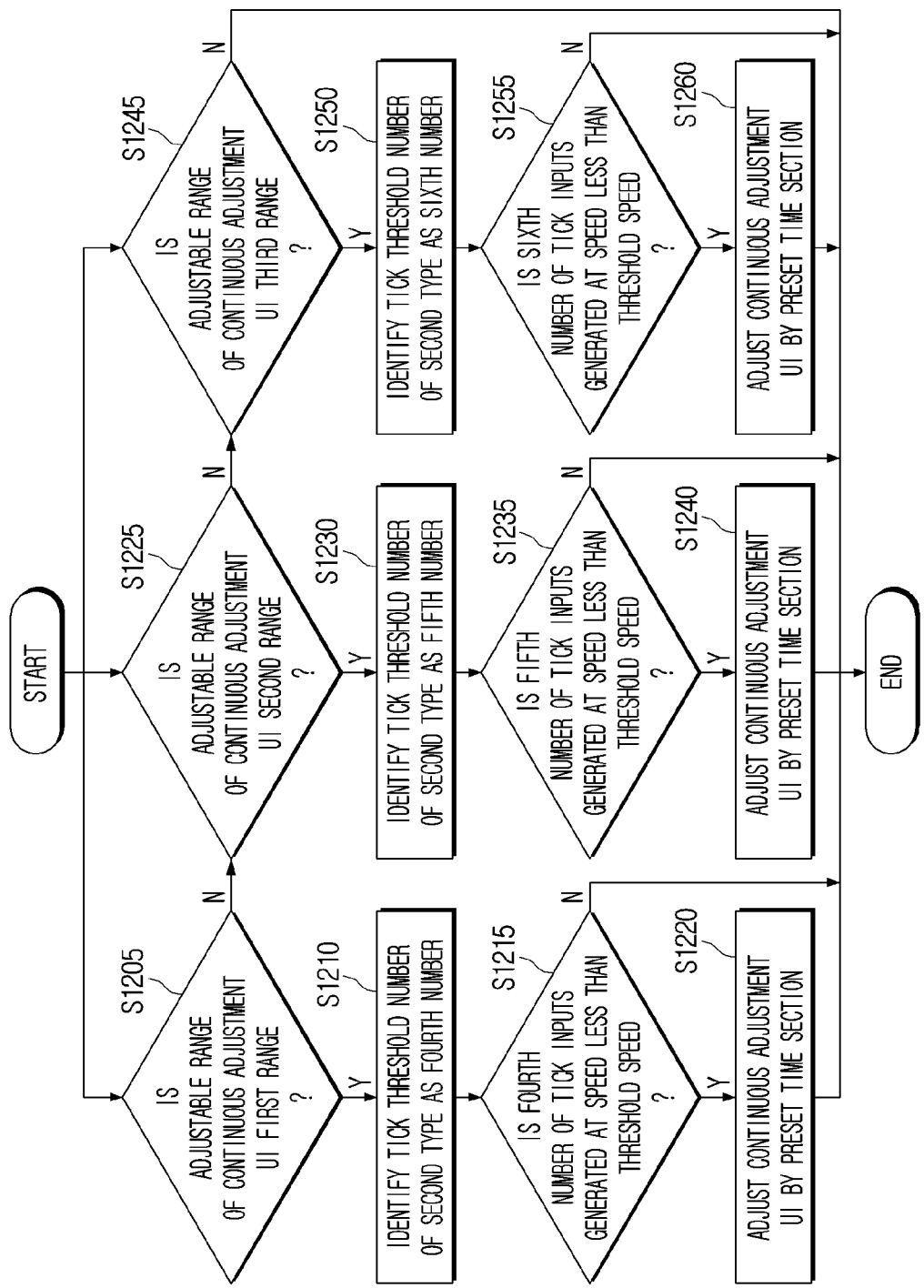
FIG. 12 is a diagram for explaining a method of adjusting a continuous adjustment UI, according to one or more embodiments.

FIG. 12 is a diagram for explaining a method of adjusting a continuous adjustment UI, according to one or more embodiments.

Referring to FIG. 12, when the adjustable range of the continuous adjustment UI provided through the display 110 is a first range (S1205:Y), the processor 120 may identify the tick threshold number of the second input type as a fourth number (S1210). Subsequently, when the fourth number of tick inputs is generated (S1215), the processor 120 may adjust the continuous adjustment UI by a preset section (S1220).

When the adjustable range of the continuous adjustment UI is not the first range (S1205: N), the processor 120 identifies whether the adjustable range of the continuous adjustment UI is a second range (S1225). When the adjustable range of the continuous adjustment UI is identified as the second range (S1225: Y), the processor 120 may identify the tick threshold number of the second input type as a fifth number (S1230). Subsequently, when the fifth number of tick inputs is generated (S1235), the processor 120 may adjust the continuous adjustment UI by a preset section (S1240).

When the adjustable range of the continuous adjustment UI is not the second range (S1225: N), the processor 120 identifies whether the adjustable range of the continuous adjustment UI is a third range (S1245). When the adjustable range of the continuous adjustment UI is identified as the third range (S1245: Y), the processor 120 may identify the tick threshold number of the second type as a sixth number (S1250). Subsequently, when the sixth number of tick inputs is generated (S1255), the processor 120 may adjust the continuous adjustment UI by a preset section (S1260). For example, the processor 120 may move a preset section (e.g., 1 section) based on a different number of tick inputs according to the adjustable range of the continuous adjustment UI.

Figure 13A:
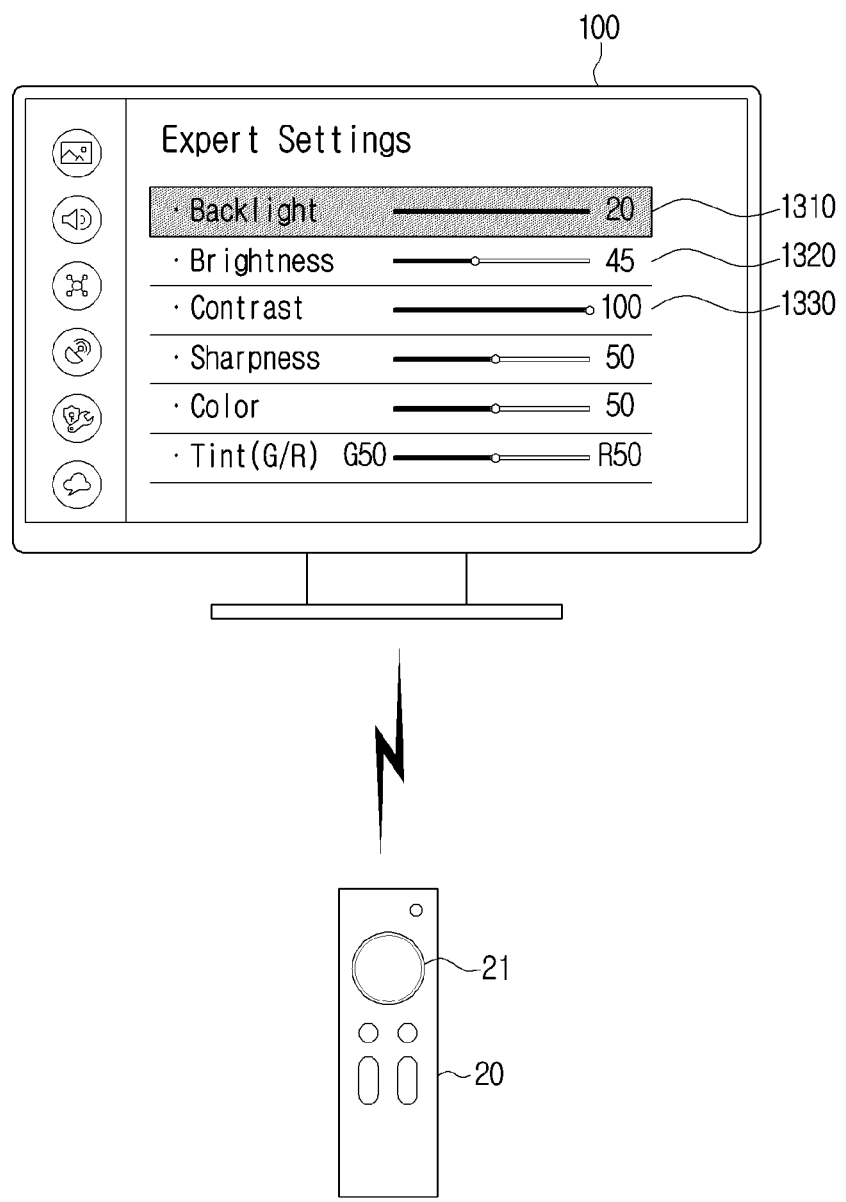
FIGS. 13A to 13C are diagrams for explaining a method of adjusting a continuous adjustment UI, according to one or more embodiments.
Figure 13B:
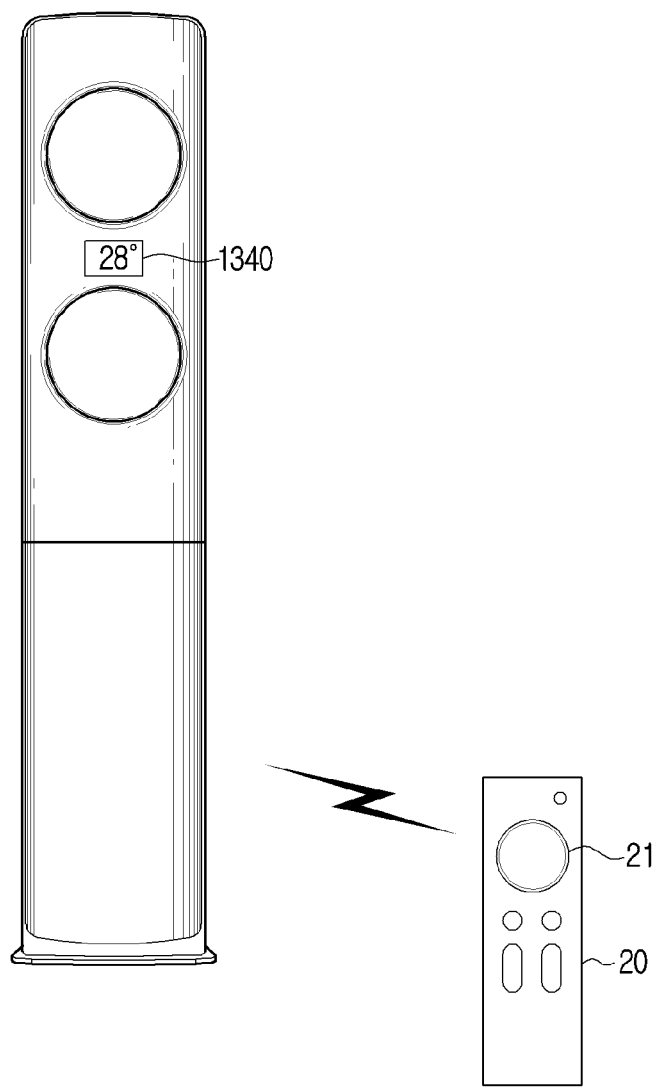
Figure 13C:
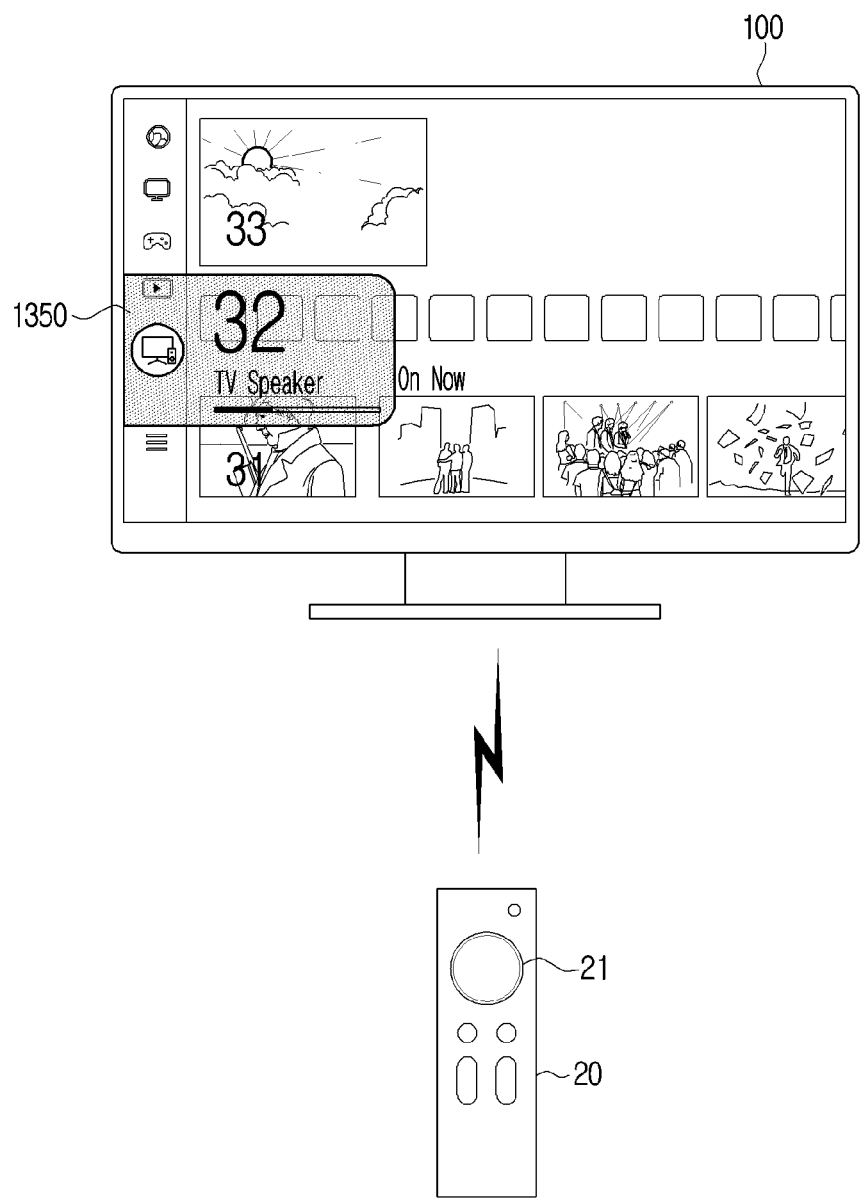

FIGS. 13A to 13C are diagrams for explaining a method of adjusting a continuous adjustment UI according to one or more embodiments.

Referring to FIGS. 13A to 13C, the processor 120 may finely adjust the UI by automatically setting the threshold number according to the length of an adjustment section in the continuous adjustment UI. For example, because the backlight brightness is generally set within the range of 0 to 20, the temperature of an air conditioner is generally set within the range of 0 to 30, and the volume, contrast, screen brightness, etc. are generally set within the range of 0 to 100, etc., the backlight brightness may correspond to a "low" level of adjustment sensitivity, the temperature of the air conditioner may correspond to a "medium" level of adjustment sensitivity, and the volume, contrast, screen brightness, etc. may correspond to a "high" level of adjustment sensitivity. For example, when a first setting has a "low" level of adjustment sensitivity compared to a second setting having a "high" level of adjustment sensitivity, an amount of an adjustment for the first setting may be less than an amount of an adjustment for the second setting based on the same number of ticks.

FIG. 13A illustrates a case of adjusting a backlight brightness control UI 1310.

Assuming that the backlight brightness may be set to 0 to 20, the processor 120 may adjust the backlight value by 1 with respect to one rotary input of 5 ticks by setting, for example, the threshold number N=5. For example, since the range of adjustable value is not large, it is possible to prevent a value from being greatly changed regardless of a user's intention by setting the manipulation sensitivity of the wheel to have a "low" level of sensitivity. When a screen brightness adjustment UI 1320 and a contrast adjustment UI 1330 are selected, the threshold number may be set to a value smaller than the backlight brightness adjustment based on the adjustable range of the corresponding UI.

FIG. 13B illustrates a case of adjusting an air conditioner temperature adjustment UI 1340.

Assuming that the temperature value may be set to 0 to 30, the processor 120 may adjust the temperature value by 1 with respect to one rotary input of 3 ticks by setting, for example, the threshold number N=3.

FIG. 13C illustrates a case of adjusting a volume control UI 1350.

Assuming that the volume value may be set to 0 to 100, the processor 120 may adjust the volume value by 1 with respect to each rotary input of 1 tick by setting, for example, the threshold number N=1. For example, since the adjustable range is large, the sensitivity may be set to a high level of sensitivity so that a quick manipulation is possible.

According to one or more embodiments, the processor 120 may transmit information about the set threshold number N value to a wheel input device 20 including a wheel 21, and adjust the corresponding value by 1 each time a signal corresponding to one rotary input is received from the wheel input device 20.

Figure 14:
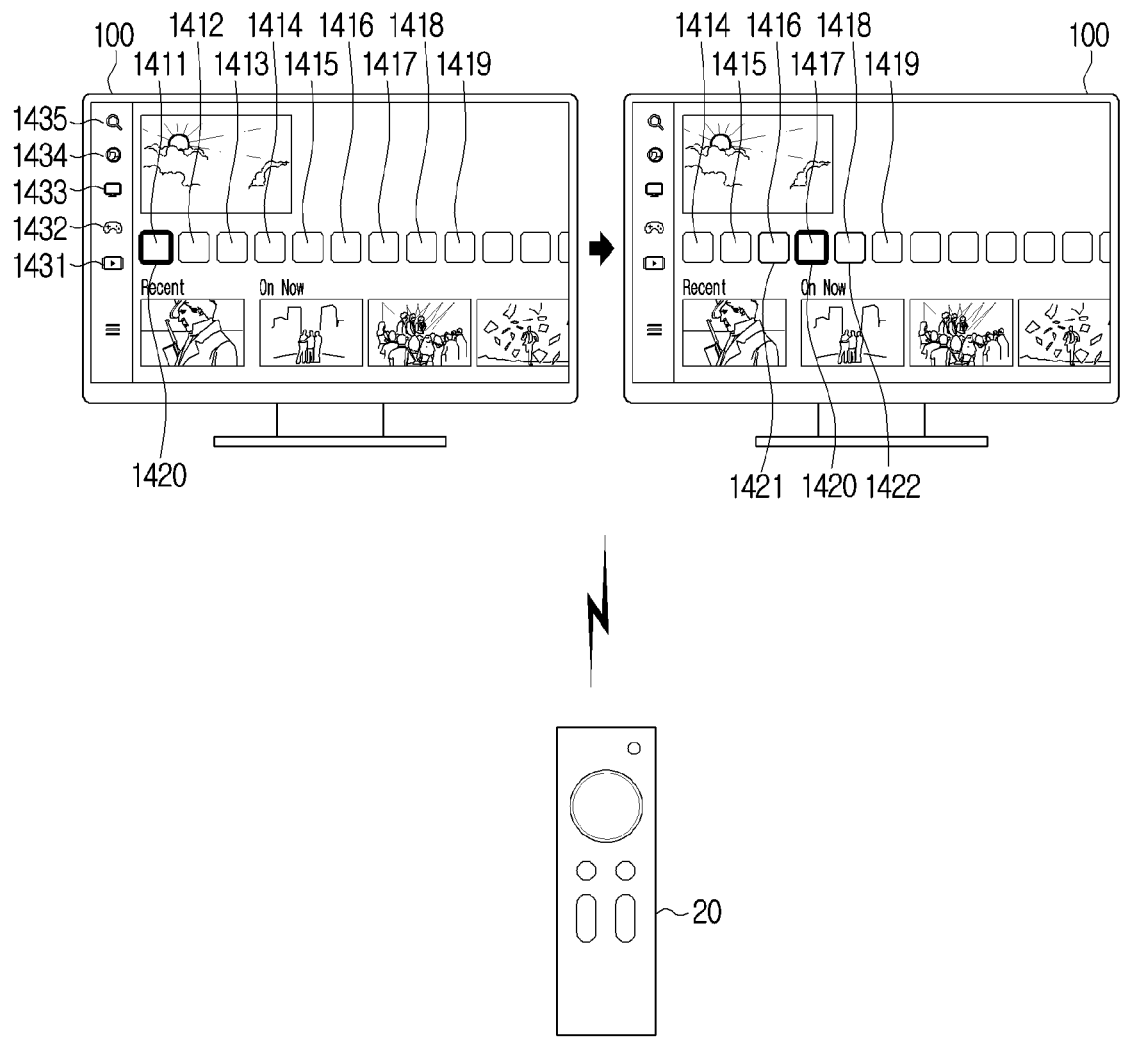
FIGS. 14 and 15 are diagrams for explaining various examples, according to a third input type.
Figure 15:
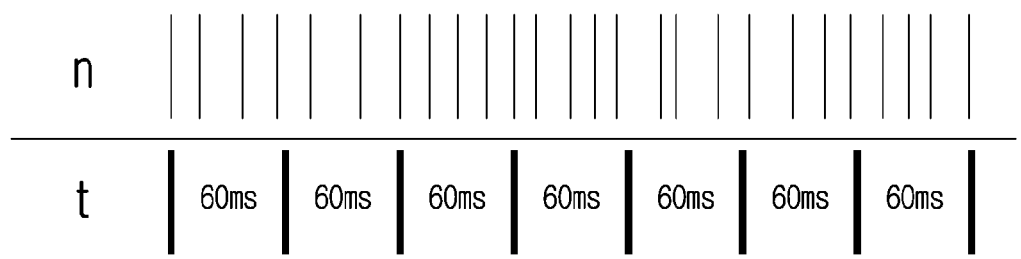

FIGS. 14 and 15 are diagrams for explaining various examples according to a third input type.

According to one or more embodiments, the processor 120 may identify that the third input type has occurred when a plurality of second input types (or a plurality of first input types) are continuously generated at a threshold speed or higher. A second UI feedback may include feedback changing the transparency of a focus GUI and continuously moving the focus GUI to a plurality of GUI items corresponding to the rotation direction of a wheel input.

As shown in FIG. 14, when the third input type is identified in a state where a focus GUI 1420 is located on a first GUI item 1411 among the plurality of GUI items arranged in the horizontal direction, the processor 120 may adjust the transparency of the focus GUI 1420 while continuously moving the focus GUI 1420 to a GUI item located in the rotation direction of the wheel, for example, in the right direction.

For example, when the focus GUI 1420 is located on a sixth GUI item 1416, focus GUIs 1421 and 1422 having lower transparency than that of the GUI 1420 may be located on a fifth GUI item 1415 adjacent to the left side of the sixth GUI item 1416 and on a seventh GUI item 1417 adjacent to the right side of the sixth GUI item 1416. For example, when the transparency of the focus GUI 1420 is 100%, the transparency of the focus GUIs 1421 and 1422 located on the fifth GUI item 1415 and the seventh GUI item 1417 may be 50%.

In one or more examples, the transparency of the focus GUI 1420 may be assigned to each of the sixth GUI item 1416, the fifth GUI item 1415, and the seventh GUI item 1417. For example, the focus GUI 1420 with 50% transparency may be located on the sixth GUI item 1416, and the focus GUIs 1421 and 1422 with 25% transparency may be located on the fifth GUI item 1415 and the seventh GUI item 1417, respectively.

In one or more examples, the transparency of the focus GUI 1420 may be allocated only to the seventh GUI item 1417 corresponding to the rotation direction of the wheel. For example, the focus GUI 1420 with 70% transparency may be located on the sixth GUI item 1416, and the focus GUI 1422 with 30% transparency may be located on the seventh GUI item 1417.

However, the embodiments are not limited thereto, and the focus GUI 1420 may be located in a form in which transparency spreads to adjacent GUI items in a Gaussian form based on a central GUI item, or in a form in which transparency spreads only to GUI items corresponding to the rotation direction of the wheel.

According to one or more embodiments, when it is identified that a GUI item having the same depth as the first GUI item 1411 is not arranged at a location corresponding to the rotation direction of a wheel input of the third type, the processor 120 may control the display 110 to display a GUI item having a different depth from that of the first GUI item 1411 or may control the display 110 to move a focus GUI to a GUI item having a different depth arranged at a location corresponding to the rotation direction and display the focus GUI.

For example, as shown in FIG. 14, when a wheel input of the left direction is identified in a state where the focus GUI 1420 is located on the first GUI item 1411, the processor 120 may identify that a GUI item having the same depth as that of the first GUI item 1411 is not arranged in the left direction. In this case, the processor 120 may display the focus GUI 1420 by moving the focus GUI 1420 to one of GUI items 1431, 1432, 1433, 1434, and 1435 vertically arranged on the left, for example, the GUI item 1431 located closest to the first GUI item 1411 in a vertical arrangement or by moving the focus GUI 1420 to the first GUI item 1435 or the last GUI item 1431 in the vertical arrangement.

As one or more examples, when it is identified that the GUI item having the same depth as that of the first GUI item 1411 is arranged in the left direction but is not displayed, the processor 120 may move displayed GUI items to the right side and display the GUI item that is not displayed on the left side of the first GUI item 1411. For example, when the first GUI item 1411 is a first GUI item in a horizontal arrangement, the processor 120 may display the last GUI item in the horizontal arrangement and GUI items arranged in reverse order in the left direction of the first GUI item 1411 and move the focus GUI 1420 in the left direction to the corresponding GUI items and display the focus GUI 1420.

As one or more examples, when it is identified that the GUI item having the same depth as that of the first GUI item 1411 is not arranged in the left direction, the processor 120 may display GUI items corresponding to the detailed depth of the first GUI item 1411 and move the focus GUI 1420 and display the focus GUI 1420 on the corresponding GUI items.

FIG. 15 illustrates a method of identifying a third input type according to one or more examples. Referring to FIG. 15, the processor 120 may calculate a rotation speed by dividing the number of ticks (or raw ticks) identified during a preset time by a time taken, and may identify the third input type based on the rotation speed. For example, the processor 120 may calculate the rotation speed by dividing the number of ticks identified within 60 ms by the time interval (e.g. 60 ms).

For example, when the rotation speed is greater than or equal to a threshold speed, the processor 120 may identify the third input type and enter a continuous key mode. For example, when the threshold speed is 30 degrees/ms, the processor 120 may enter the continuous key mode when identifying a speed equal to or greater than 30 degrees/ms, and maintain the continuous key mode when the speed equal to or greater than 30 degrees/ms is maintained. In one or more examples, the processor 120 may release the continuous key mode when a wheel input is not identified for a preset time after entering the continuous key mode or when a wheel input of a speed equal to or greater than a specific speed is not identified. For example, a threshold speed for releasing the continuous key mode may be different from a threshold speed for entering and maintaining the continuous key mode.

In one or more examples, a threshold speed for entering the continuous key mode may be different from the threshold speed for maintaining the continuous key mode. For example, the processor 120 may enter the continuous key mode when a speed equal to or greater than 60 degrees/ms is identified, and maintain the continuous key mode when a speed equal to or greater than 30 degrees/ms is maintained.

According to various embodiments described above, it is possible to provide a navigation experience that meets the user's intention by classifying types of wheel input into three types. In addition, it is possible to provide a manipulation experience that meets each user's intention with respect to a fine manipulation or a fast continuous operation.

The methods according to various embodiments of the present disclosure described above may be implemented in the form of an application that may be installed in an existing electronic apparatus. At least some of the above-described methods, according to various embodiments of the present disclosure, may be performed using a deep learning-based artificial intelligence model (e.g., a learning network model).

In addition, the methods according to various embodiments of the present disclosure described above may be implemented only by upgrading software or hardware of an existing electronic apparatus.

In addition, various embodiments of the present disclosure described above may be performed through an embedded server included in the electronic apparatus or an external server of the electronic apparatus.

According to one or more embodiments of the present disclosure, the various embodiments described above may be implemented as software including instructions stored in a machine (e.g., a computer)-readable storage medium. The machine is a device capable of calling a stored command from a storage medium and operating according to the called command, and may include an electronic apparatus (e.g., an electronic apparatus A) according to the disclosed embodiments. When a command is executed by a processor, the processor may perform a function corresponding to the command directly or by using other components under the control of the processor. The command may include code generated or executed by a compiler or interpreter. The machine-readable storage media may be provided in the form of non-transitory storage media. Here, 'non-temporary' means that the storage media do not include a signal and is tangible, but do not distinguish whether data is stored semi-permanently or temporarily on the storage media.

According to one or more embodiments of the present disclosure, the method according to various embodiments described above may be provided in a computer program product. The computer program product may be traded between a seller and a purchaser as a commodity. The computer program product may include a product in the form of a machine-readable storage medium (e.g., compact disc read only memory (CD-ROM)) or may be online distributed through an application store (e.g., Google Play Store™ or AppStore™). In a case of electronic distribution, at least a part of the computer program product may be stored or created temporarily on a storage medium such as memory of a server of a manufacturer, a server of an application store, or a relay server.

Each component (for example, a module or a program) according to various embodiments described above may be composed of a singular entity or a plurality of entities, and some of the above-described subcomponents may be omitted, or other subcomponents may be further included in various embodiments. Alternatively or additionally, some components (e.g., modules or programs) may be integrated into one entity to perform a function performed by each corresponding component prior to integration in the same or similar manner. Operations performed by a module, program, or other component according to various embodiments may be performed sequentially, in parallel, repeatedly, or heuristically, or at least some operations may be performed in a different order, omitted, or another operation may be added.

While the above has been illustrated and described with respect to embodiments of the disclosure, the disclosure is not limited to the above-described specific embodiments, and may be variously modified by those skilled in the pertinent art without departing from the gist of the disclosure as claimed in the claims, and such modifications should not be individually understood from the technical idea or the prospect of the disclosure.

The invention claimed is:

1. An electronic apparatus comprising:
   a display; and
   one or more processors configured to:
     control the display to display a user interface (UI) screen including a plurality of graphical user interface (GUI) items and a focus GUI located on a first GUI item from the plurality of GUI items,
     identify, based on at least one of a rotation distance or a rotation speed of a wheel input, an input type of the wheel input from a plurality of input types of wheel inputs,
     based on identification of the wheel input as a first input type, control the display to provide a first UI feedback to at least one of the first GUI item, a second GUI item corresponding to the rotation direction of the wheel input, or the focus GUI, the first input type identified based on a movement of the wheel from a start point in a first direction and a return of the wheel to the start point in a second direction opposite to the first direction in which a tick input corresponding to the movement of the wheel is less than a threshold number,
     based on identification of the wheel input as a second input type, control the display to move the focus GUI to the second GUI item and display the focus GUI, and
     based on identification of the wheel input as a third input type, control the display to provide a second UI feedback to the focus GUI while continuously moving the focus GUI sequentially through the plurality of GUI items corresponding to the rotation direction of the wheel input.

2. The electronic apparatus of claim 1, wherein
   the second input type is identified based on a movement of the wheel in which tick inputs corresponding to movement of the wheel greater than or equal to the threshold number are generated at a speed less than a threshold speed,
   the third input type is identified based on a movement of the wheel in which tick inputs corresponding to movement of the wheel greater than or equal to the threshold number are generated at a speed greater than or equal to the threshold speed, and the tick input is an input corresponding to a basic manipulation unit of the wheel on at least one of a wheel button or a touch panel receiving the wheel input.

3. The electronic apparatus of claim 1, wherein the first UI feedback includes at least one of a feedback providing a motion to the first GUI item, a feedback changing a transparency of the focus GUI located on the first GUI item, a feedback displaying a focus GUI with a preset transparency on the second GUI item, or a feedback changing a size of the second GUI item, and the second UI feedback includes a feedback continuously moving sequentially through the plurality of GUI items corresponding to the rotation direction of the wheel input by changing the transparency of the focus GUI.

4. The electronic apparatus of claim 1, wherein the one or more processors are configured to:

enter a continuous key mode based on the wheel input being identified as the third input type, and release the continuous key mode based on the wheel input of the third input type not being identified for a threshold time in the continuous key mode.

5. The electronic apparatus of claim 1, wherein the second input type is identified based on an event in which tick inputs corresponding to movement of the wheel greater than or equal to the threshold number are generated at the speed less than the threshold speed, and the one or more processors are configured to, based on the wheel input being identified while content is played back through the display, identify the threshold number corresponding to the second input type as having a value such that the threshold number corresponding to the second input type is inversely proportional to a length of the content.

6. The electronic apparatus of claim 5, wherein the one or more processors are configured to:

identify the threshold number corresponding to the second input type as a first number based on a length of a first content, and adjust a playback section of the first content by a preset time section based on a wheel input of the second input type in which the first number of tick inputs is generated at the speed less than the threshold speed, identify the threshold number corresponding to the second input type as a second number greater than the first number based on a length of a second content and adjust a playback section of the second content by the preset time section based on the wheel input of the second input type in which the second number of tick inputs is generated at the speed less than the threshold speed, and identify the threshold number corresponding to the second input type as a third number greater than the second number based on a length of a third content and adjust a playback section of the content by the preset time section based on the wheel input of the second input type in which the third number of tick inputs is generated at the speed less than the threshold speed, wherein the length of the second content is longer than the length of the third content and shorter than the length of the first content.

7. The electronic apparatus of claim 1, wherein the second input type is identified based on an event in which tick inputs greater than or equal to the threshold number are generated at a speed less than a threshold speed, and the one or more processors are configured to, based on the wheel input being identified while a continuous adjustment UI having an adjustable range is provided through the display, identify the threshold number corresponding to the second input type as having a value such that the threshold number corresponding to the second input type is inversely proportional to a length of the adjustable range.

8. The electronic apparatus of claim 1, wherein the one or more processors are configured to control the display to provide the first UI feedback based on the wheel input being identified as the first input type before the focus GUI moves horizontally from the first GUI item to the second GUI item, before the focus GUI moves vertically from the first GUI item to the second GUI item, or before the focus GUI moves vertically from the first GUI item to the second GUI item and a line break occurs.

9. The electronic apparatus of claim 1, wherein the one or more processors are configured to, based on a determination that a GUI item having a same depth as that of the first GUI item is not arranged at a location corresponding to the rotation direction of the wheel input, control the display to display a GUI item having a different depth from that of the first GUI item or control the display to move the focus GUI to a GUI item of a different depth arranged at a location corresponding to the rotation direction and display the focus GUI.

10. The electronic apparatus of claim 1, wherein the one or more processors are configured to, based on the wheel input being identified as the second input type, control the display to increase a size of the second GUI item while moving the focus GUI to the second GUI item and displaying the focus GUI, and based on the wheel input being identified as the third input type, control the display to continuously move the focus GUI to the plurality of GUI items corresponding to the rotation direction of the wheel input so that a size of a GUI item on which the focus GUI is located is maintained.

11. A method of providing a UI of an electronic apparatus, the method comprising:

displaying a user interface (UI) screen including a plurality of graphical user interface (GUI) items and a focus GUI located on a first GUI item from the plurality of GUI items;

identifying, based on at least one of a rotation distance or a rotation speed of a wheel input, an input type of the wheel input from a plurality of input types of wheel inputs; and controlling the UI screen based on the identified input type of the wheel input, and wherein the controlling of the UI screen includes, based on identification of the wheel input as a first input type, providing a first UI feedback to at least one of the first GUI item, a second GUI item corresponding to the rotation direction of the wheel input, or the focus GUI, the first input type identified based on a movement of the wheel from a start point in a first direction and a return of the wheel to the start point in a second direction opposite to the first direction in which a tick input corresponding to the movement of the wheel is less than a threshold number, based on identification of the wheel input as a second input type, moving the focus GUI to the second GUI item and displaying the focus GUI, and based on identification of the wheel input as a third input type, providing a second UI feedback to the focus GUI while continuously moving the focus GUI sequentially through a plurality of GUI items corresponding to the rotation direction of the wheel input.

12. The method of claim 11, wherein the second input type is identified based on a movement of the wheel in which tick inputs greater than or equal to the threshold number are generated at a speed less than a threshold speed, the third input type is identified based on a movement of the wheel in which tick inputs greater than or equal to the threshold number are generated at a speed greater than or equal to the threshold speed, and the tick input is an input corresponding to a basic manipulation unit of the wheel on at least one of a wheel button or a touch panel receiving the wheel input.

13. The method of claim 11, wherein the first UI feedback includes at least one of a feedback providing a motion to the first GUI item, a feedback changing a transparency of the focus GUI located on the first GUI item, a feedback displaying a focus GUI with a preset transparency on the second GUI item, or a feedback changing a size of the second GUI item, and the second UI feedback includes a feedback continuously moving sequentially through the plurality of GUI items corresponding to the rotation direction of the wheel input by changing the transparency of the focus GUI.

14. The method of claim 11, wherein the controlling of the UI screen includes entering a continuous key mode based on the wheel input being identified as the third input type, and releasing the continuous key mode based on the wheel input of the third input type not being identified for a threshold time in the continuous key mode.

15. The method of claim 11, wherein the second input type is identified based on an event in which tick inputs corresponding to movement of the wheel greater than or equal to the threshold number are generated at the speed less than the threshold speed, the method further comprising:

based on the wheel input being identified while content is played back through the display, identifying the threshold number corresponding to the second input type as having a value such that the threshold number corresponding to the second input type is inversely proportional to a length of the content.

\* \* \* \* \*